(12) United States Patent
A et al.

(10) Patent No.: US 10,476,755 B1
(45) Date of Patent: Nov. 12, 2019

(54) MULTI VENDOR DEVICE SUPPORT IN NETWORK MANAGEMENT SYSTEMS

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/212,150

(22) Filed: Dec. 6, 2018

Related U.S. Application Data

(63) Continuation of application No. 15/283,030, filed on Sep. 30, 2016, now Pat. No. 10,230,585.

(51) Int. Cl.
| | | |
|---|---|---|
| *G06F 15/173* | (2006.01) | |
| *H04L 12/24* | (2006.01) | |
| *H04L 12/26* | (2006.01) | |
| *H04L 29/08* | (2006.01) | |

(52) U.S. Cl.
CPC .......... *H04L 41/145* (2013.01); *H04L 43/045* (2013.01); *H04L 67/06* (2013.01)

(58) Field of Classification Search
CPC ...... H04L 41/145; H04L 43/045; H04L 67/06
USPC ........................................................ 709/223
See application file for complete search history.

(56) References Cited

U.S. PATENT DOCUMENTS

| | | | |
|---|---|---|---|
| 8,677,184 B2 * | 3/2014 | Astigarraga | H04L 43/0817 714/37 |
| 8,891,404 B2 * | 11/2014 | Bertani | H04L 41/046 370/254 |
| 8,914,868 B2 * | 12/2014 | Anantharamiah | H04L 41/0806 370/254 |
| 9,021,078 B2 * | 4/2015 | Nikaido | G06Q 10/20 709/223 |
| 9,172,612 B2 * | 10/2015 | Porter | H04L 41/12 |
| 9,245,236 B2 | 1/2016 | Maes | |
| RE45,959 E | 3/2016 | McCord et al. | |
| 9,659,251 B2 | 5/2017 | Tang et al. | |
| 9,762,553 B2 | 9/2017 | Ford et al. | |
| 9,807,031 B2 | 10/2017 | Haris et al. | |
| 9,813,318 B2 * | 11/2017 | Iyoob | H04L 43/08 |
| 9,838,272 B2 | 12/2017 | Djukic et al. | |

(Continued)

OTHER PUBLICATIONS

Notice of Allowance from U.S. Appl. No. 15/281,602, dated Feb. 20, 2019, 9 pp.

(Continued)

*Primary Examiner* — Melvin H Pollack
(74) *Attorney, Agent, or Firm* — Shumaker & Sieffert, P.A.

(57) ABSTRACT

In one example, a network management system (NMS) is configured to enable a target network device to support a particular network service based on service configuration information for the particular network service. The service configuration information may include information about nodes in a vendor neutral model that need to be added or modified in order to support the particular network service. The NMS determines similarity scores between nodes in a vendor neutral model and nodes in a target device specific model. Based on the similarity scores, the NMS generates a mapping from the vendor neutral model to the target device specific model. Using the mapping, the NMS may configure a target device to support the particular service.

19 Claims, 5 Drawing Sheets

(56) References Cited

U.S. PATENT DOCUMENTS

| | | | |
|---|---|---|---|
| 9,882,969 B2 | 1/2018 | Reddy et al. | |
| 9,917,763 B2* | 3/2018 | Fallon | H04L 41/5009 |
| 9,918,190 B2* | 3/2018 | Bourque | H04W 4/021 |
| 9,923,765 B2* | 3/2018 | Allen | H04L 41/046 |
| 9,965,735 B2* | 5/2018 | Ramesh Babu | G06Q 10/0637 |
| 9,973,390 B2 | 5/2018 | Bhatia et al. | |
| 10,050,842 B2* | 8/2018 | Salam | H04L 41/16 |
| 10,057,239 B2* | 8/2018 | Chickering | H04L 63/0815 |
| 10,091,058 B2* | 10/2018 | Strassner | H04L 41/0816 |
| 10,091,060 B2* | 10/2018 | Croy | H04L 41/082 |
| 10,122,583 B2* | 11/2018 | George | G06F 16/1748 |
| 10,230,568 B2* | 3/2019 | Maes | H04L 41/0893 |
| 10,263,879 B2* | 4/2019 | Hildebrand | H04L 43/50 |
| 10,305,758 B1* | 5/2019 | Bhide | H04L 41/22 |
| 10,338,572 B2* | 7/2019 | Pradas | H04W 8/22 |
| 2012/0110028 A1 | 5/2012 | Athreya et al. | |
| 2013/0282886 A1* | 10/2013 | Taylor | H04L 41/12 709/223 |
| 2014/0108072 A1 | 4/2014 | McGowan et al. | |
| 2014/0156851 A1 | 6/2014 | Suami et al. | |
| 2015/0127792 A1 | 5/2015 | Messinger et al. | |
| 2015/0156122 A1 | 6/2015 | Singh et al. | |
| 2016/0143075 A1 | 5/2016 | Tucker et al. | |
| 2016/0337272 A1 | 11/2016 | Berman et al. | |
| 2016/0352653 A1 | 12/2016 | Ranganathan et al. | |
| 2016/0373310 A1 | 12/2016 | Banikazemi et al. | |
| 2017/0024447 A1* | 1/2017 | Bowman, Jr. | G06Q 10/101 |
| 2017/0054603 A1 | 2/2017 | Kulkarni et al. | |
| 2017/0093645 A1 | 3/2017 | Zhong et al. | |
| 2017/0195458 A1* | 7/2017 | Parekh | G06F 9/547 |
| 2017/0235848 A1 | 8/2017 | Van Dusen et al. | |
| 2017/0279684 A1 | 9/2017 | Khalil et al. | |
| 2018/0013662 A1* | 1/2018 | Salam | H04L 12/4641 |
| 2018/0060394 A1 | 3/2018 | Gawande et al. | |
| 2018/0089303 A1 | 3/2018 | Miller et al. | |
| 2018/0146051 A1 | 5/2018 | Deshmukh et al. | |
| 2018/0322558 A1* | 11/2018 | Padmanabh | G06Q 30/0623 |

OTHER PUBLICATIONS

Bjorklund et al., "YANG—A Data Modeling Language for the Network Configuration Protocol (NETCONF)," RFC 6020, Internet Engineering Task Force (IETF), Oct. 2010, 173 pp.

Enns, "NETCONF Configuration Protocol," RFC 4741, Network Working Group, Dec. 2006, 95 pp.

Harrington et al., "An Architecture for Describing Simple Network Management Protocol (SNMP) Management Frameworks," RFC 3411, Network Working Group, Dec. 2002, 58 pp.

Thang et al., "XML Schema Automatic Matching Solution," International Journal of Electrical, Computer, and Systems Engineering, 4 (1), 2010, 7 pp.

U.S. Appl. No. 15/283,030, by Chandrasekhar A, filed Sep. 30, 2016.

Zerdazi et al., "Computing Path Similarity relevant to XML Schema Matching," Conference: On the Move to Meaningful Internet Systems: OTM 2008 Workshops, Nov. 2008, 10 pp.

Zhang et al., "Simple Fast Algorithms for the Editing Distance Between Trees and Related Problems," Society for Industrial and Applied Mathematics, vol. 18, No. 6, Dec. 1989, pp. 1245-1262.

U.S. Appl. No. 15/281,602, by Chandrasekhar A, filed Sep. 30, 2016.

Office Action dated Oct. 5, 2018 in U.S. Appl. No. 15/281,602, 8 pp.

* cited by examiner

MULTI VENDOR DEVICE SUPPORT IN NETWORK MANAGEMENT SYSTEMS

This application is a continuation of U.S. application Ser. No. 15/283,030, filed Sep. 30, 2016, the entire contents of which is incorporated herein by reference.

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may receive information either by polling the managed device or by receiving asynchronous events from the devices. In this way, the management interfaces of the managed device may be used to access current operating parameters, system logs, information related to network connectivity, network activity or other status information for the devices, allowing clients to view and react to event information received from the devices.

In some cases, a network management system (NMS) device may manage multiple devices of different types, e.g., from different vendors. Vendors often provide different protocols for managing similar types of devices. For example, different vendors of routers may offer different protocols for configuring services performed by the routers. Typically, the NMS device will be configured with specific configuration schemas (e.g., specified in a data modeling language such as YANG) for devices to be managed from each of the vendors.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. In order to configure new devices to support network services provided in a network system, a user (such as an administrator) a translation template to map a vendor neutral model to a device specific model. Further, in order to configure devices to perform new types of services, a user (such as an administrator) needs to provide a service model that defines the new types of services as well as a mapping file to map the service model to a device configuration model. As each different vendor requires a unique translation template such that, as new devices from different vendors are added to the network, the user/administrator has to generate new translation templates to enable the NMS to support the new devices.

SUMMARY

In general, this disclosure describes techniques for automatically generating translation templates from a vendor neutral model to a vendor specific model. Typically, when an administrator adds a new, currently unsupported device to a network managed by a particular NMS, the administrator may need to manually generate a translation template from the vendor neutral YANG model to the device specific YANG model for the currently unsupported device. In some instances, when the administrator configures a new service to be supported by the devices, the administrator provides a service model and a translation template that maps the service model to the vendor neutral YANG model. However, in order to configure a new device to support the new service model, the user may need to manually generate a mapping from the vendor neutral YANG model to the device specific YANG model.

Rather than requiring an administrator to manually create the translation template from the vendor neutral model to the device specific model, techniques of this disclosure may intelligently analyze the vendor neutral YANG model, the device specific YANG model for the currently unsupported device, and any existing device specific YANG models for other supported devices to dynamically generate the translation template from the vendor neutral YANG model to the device specific YANG model for the currently unsupported device That is, the techniques may automatically generate a translation template, such as a mapping file, from a vendor neutral YANG model to a device specific YANG model and may use existing device specific YANG models from devices that are already supported by the NMS. In this way, device from different vendors may be more easily supported using the techniques of this disclosure as compared to previous techniques.

In one example, a method includes receiving, by a network management device, a target device specific model for a target network device and a vendor neutral model, wherein the vendor neutral model includes a plurality of source nodes and the target device specific model includes a plurality of target nodes, and wherein the target device does not currently support at least one network service, and, for each node in the plurality of source nodes, determining, by the network management device and based on the target device specific model, a respective similarity score for each unique source node and target node pair, the respective similarity score indicating an amount of similarity between the source node and the target node of the corresponding source node and target node pair. The method may also include generating, by the network management device and based on the respective similarity scores for the source node and target node pairs, a translation template of nodes of the vendor neutral model to nodes of the target device specific model, the translation template to include at least one source node and an associated target node, and configuring, by the network management device and using the translation template, the target network device to support for the at least one network service.

In some examples, a network management system includes an interface configured to receive a target device specific model for a target network device and a vendor neutral model, wherein the vendor neutral model includes a plurality of source nodes and the target device specific model includes a plurality of target nodes, and wherein the target device does not currently support at least one network service, one or more network interfaces communicatively coupled to a plurality of network devices, wherein the target network device is one of the plurality of network devices, and one or more hardware-based processors, implemented using discrete logic circuitry. The one or more processors may be configured to for each node in the set of source nodes, determine, based on the target device specific model, a respective similarity score for each unique source node and target node pair, the respective similarity score indicating an amount of similarity between the source node and the target node of the corresponding source node and target node pair, generate, based on the respective similarity scores for the source node and target node pairs, a translation template of nodes of the vendor neutral model to nodes of the target device specific model, the translation template to include at least one source node and an associated target node, and configure, using the translation template, the target network device to support for the at least one network service.

In some examples, a non-transitory computer-readable storage medium comprises instructions that, when executed, cause a processor of a network management system to retrieve a target device specific model for a target network device and a vendor neutral model, wherein the vendor neutral model includes a plurality of source nodes and the target device specific model includes a plurality of target nodes, and wherein the target device does not currently support at least one network service, and for each node in the set of source nodes, determine, based on the target device specific model, a respective similarity score for each unique source node and target node pair, the respective similarity score indicating an amount of similarity between the source node and the target node of the corresponding source node and target node pair. The instructions may also cause the processor to generate, based on the respective similarity scores for the source node and target node pairs, a translation template of nodes of the vendor neutral model to nodes of the target device specific model, the translation template to include at least one source node and an associated target node, and configure, using the translation template, the target network device to support for the at least one network service.

The details of one or more examples are set forth in the accompanying drawings and the description below. Other features, objects, and advantages will be apparent from the description and drawings, and from the claims.

DETAILED DESCRIPTION

Figure 1:
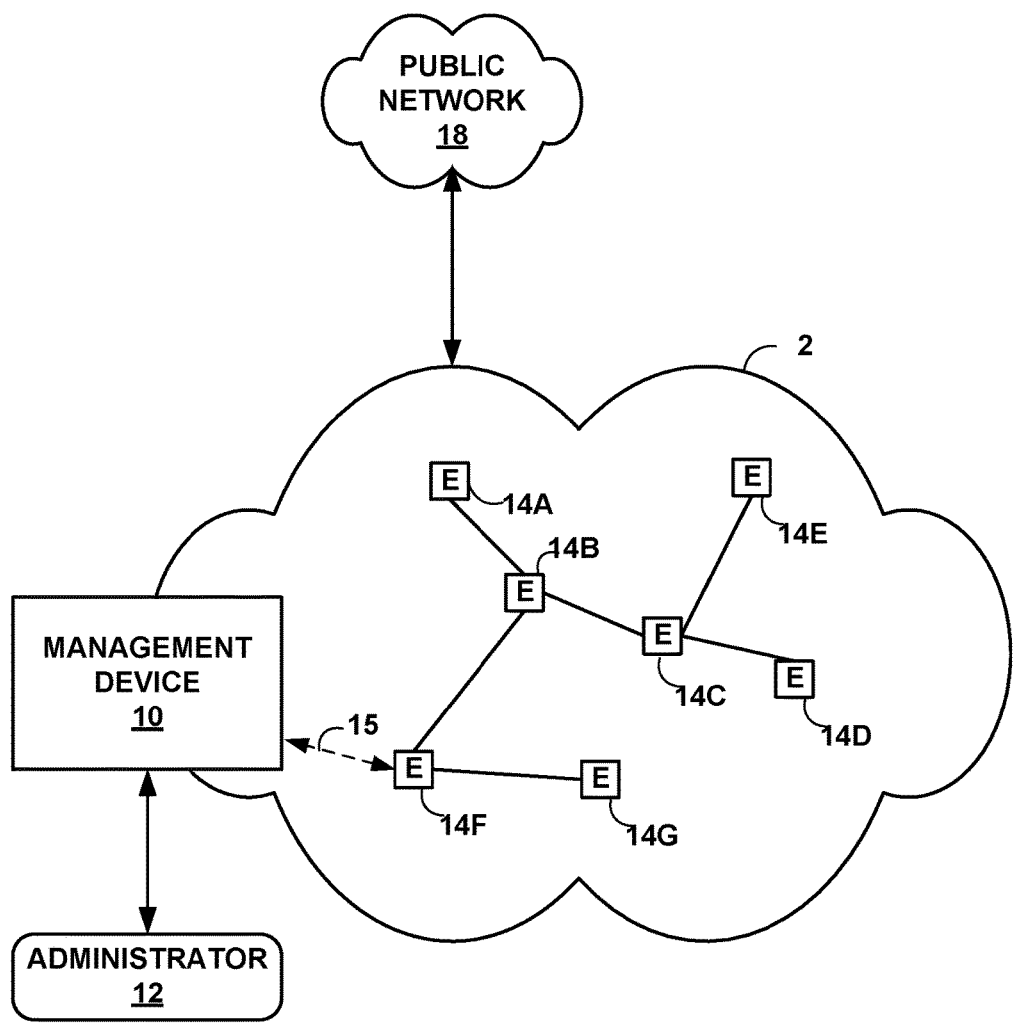
FIG. 1 is a block diagram illustrating an example including elements of an enterprise network that are managed using a management device.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to the various elements 14. Once elements 14 are deployed and activated, administrator 12 uses management device 10 to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS) or NMS device, and elements 14 are centrally maintained by an IT group of the enterprise. Administrator 12 interacts with management device 10 to remotely monitor and configure elements 14. For example, administrator 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using management device 10, to directly configure element 14F. In this manner, a user can provide commands in a format for execution directly to elements 14.

Further, administrator 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrator 12 uses management device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietforg/html/rfc4741. Management device 10 may establish NETCONF sessions with one or more of elements 14.

In general, elements 14 may generally provide similar services. For example, each of elements 14 (or a subset thereof) may be a router. However, in some instances, administrator 12 may create a new custom service model to provide addition, different, or improved services in network 2. Each different element 14 may be provided by a different vendor and may include different device specific configuration information and difference device specific structure of the configuration information. In an attempt to simplify adding support for new custom service models to the various device, management device 10 may enable administrator 12 to provide a service model for the new custom service and a mapping file that maps the service configuration to a vendor neutral configuration. However, in order to configure elements 14 to support the new custom service, administrator 12 needs to generate a mapping file to map the vendor neutral configuration into a corresponding device model for each different vendor of elements 14.

Further, from time to time new devices may be added to network 2 and elements 14 may be configured to support new services. Each different element 14 may be provided by a different vendor and may include different device specific configuration information and different device specific structure of the configuration information such that, when a new device is added to network 2, management device 10 may need to generate a translate template to map a vendor neutral model to a target device specific model for the new device. Management device 10 may enable administrator 12 to provide a device specific model for the new device (e.g., element 14A). However, in order to configure element 14A to support the services provided by the other elements 14, administrator 12 also needs to provide a mapping from the vendor neutral model to the device specific model for element 14A.

The various vendor neutral and device specific models may be implemented using any data modeling language, such as the YANG data modeling language, which is described in Bjorklund, "YANG—A Data Modeling Language for the Network Configuration Protocol (NETCONF)," Internet Engineering Task Force, RFC 6020, October 2010, available at tools.ietf.org/html/rfc6020). While described throughout as a "service model," a "vendor neutral model," and a "device specific model," the terms "service configuration file," "vendor neutral configuration file," and "device specific configuration file" may also be used to refer to the same set of configuration information as the respective models.

In accordance with the techniques of this disclosure, rather than requiring administrator 12 to provide the mapping from the vendor neutral model to the target device specific model for the new device, management device 10 is configured to generate vendor neutral to device specific translation templates based on an analysis of the vendor neutral model, the target device specific model, and, in some examples, the device specific models for any already supported devices. In various examples, management device 10 may be configured to analyze each model one at a time. In other examples, management device 10 may be configured to process each node one at a time and search for the node in all of the models, one node at a time. In some instances, management device 10 may be configured to do a hybrid of these two approaches such that, in some instances, management device 10 may process certain models one node at a time while processing the other models one model at a time. For purposes of readability and clarity, the examples described below include examples where management device 10 is configured to process one model at a time (e.g., the vendor neutral model first, then an already-supported device specific model, etc.), however the techniques described herein may be applied regardless of the order in which management device 10 processes the nodes and models.

In instances where administrator 12 is configuring elements 14 to support a new custom services, management device 10 may identify the relevant nodes that need to be mapped based on the service model to vendor neutral model mapping provided by administrator 12 for the new service. This mapping identifies the particular configuration information that needs to be added or modified to support the custom service and identifies the nodes in the vendor neutral model that correspond to the particular configuration information. Management device 10 may use these identified nodes in the vendor neutral model to identify the target nodes in the to-be supported device specific model as well as any already-supported device specific models.

Typically, each model includes several YANG modules, each of which covers a particular portion of the configuration information for the device. When generating the device specific translation template for the to be supported device (e.g., element 14A), for each node that needs to be mapped, management device 10 may first identify the particular YANG module that includes the particular node currently being matched. That is, management device 10 may first identify the particular YANG module that includes the match for the current node. In deciding which YANG module to select, management device 10 performs a module similarity analysis and selects the YANG module that is the most similar to the YANG module for the already supported device. In some examples, YANG module similarity is determined based on the linguistic similarity of one or more of the module name or the module description.

Management device 10 traverses the tree structure of the identified YANG module to identify potential nodes that need to be updated to support the custom service. Rather than comparing all of the configuration nodes of the identified YANG module, management device 10 considers configuration nodes having at least one parent node or child node in the canonical path of the target model node which has a determined similarity value that satisfies a similarity threshold value. In traversing the nodes in the identified YANG module, management device 10 retrieves the schema node from the YANG module from the source model (e.g., the vendor neutral model, the vendor specific model for an already supported device, etc.—the schema node is referred to herein as the "source schema node" or "source node" of the YANG module from the already supported device), iterates through each schema node of the identified YANG module of the target device specific model (referred to herein as the "target schema node" or "target node" of the identified YANG module), and determines if any of the ancestors or children of the target node has a similarity score that satisfies the threshold. If none of the children or ancestors have a similarity score that satisfies the threshold, management device 10 moves to the next target node. If at least one of the children or ancestors of the target node has a similarity score that satisfies the threshold, management device 10 determines the similarity score between the source node and the target node.

In order to determine the similarity score between the source node and the target node, management device 10 computes one or more of a data type similarity (i.e., determines how similar the data type of the source node is to the data type of the target node), a word distance between the source node attribute names and the target node attribute names, a structural similarity score of the sub-trees of the source node and target nodes, a linguistic similarity between the attribute names of the target and source nodes, a linguistic similarity between the attribute descriptions of the target and source nodes, or the overall similarity based on a combination of the determined similarity scores of all the ancestors. Using these computed similarity characteristics, management device 10 calculates an overall similar score for the target node.

As management device 10 determines the similarity scores for the various nodes in the identified YANG module of the target device, management device 10 generates a similarity matrix for the identified YANG module. That is, traversing the identified YANG module and comparing the source nodes and the target nodes as described above, results in a similarity matrix for the nodes in the identified YANG module, where each node has a respective similarity score. The matrix identifies the source node, the target node, and the similarity score for that particular source and target node combination. Using the similarity matrix, management device 10 builds a translation template that maps nodes in the source YANG model to nodes in the identified YANG model for the target device. The translation template maps the target node with the maximum similarity for each source node. For example, an entry in the translation template includes information about a source node (e.g., a node in the YANG module from the vendor neutral model, the already supported device) and a target node (i.e., a node in the YANG module from the to-be supported device) for each of the nodes in the identified YANG module.

In various instances, management device 10 may use the source-to-target translation template to generate device specific configuration information for the target network device, thereby enabling the target network device to support the services provided in network 2. For example, in instances where administrator 12 is configuring a new custom service, management device 10 may use the source-to-target translation template to modify the vendor provided translation template from the vendor neutral model to the vendor specific model. Once modified, the vendor specific model supports the new custom service.

From time to time, management device 10 may not find a match that satisfies the threshold. In such instances, management device 10 may present the unmatched nodes to administrator 12 to enable the administrator to take corrective actions. Management device 10 may receive the corrective actions and update the matching process so as to provide higher quality results in the future. That is, management device 10 may use feedback from administrator 12 to dynamically adapt the matching process to reduce future errors.

In this way techniques of this disclosure may simplify the process for configuring devices to support custom services. That is, by comparing existing vendor specific models that support the custom services to vendor specific models for target device (i.e., devices that do not yet support the custom services), techniques of this disclose may enable a management system to automatically generate the vendor neutral to device specific translation template required to support the custom services on the target device.

Figure 2:
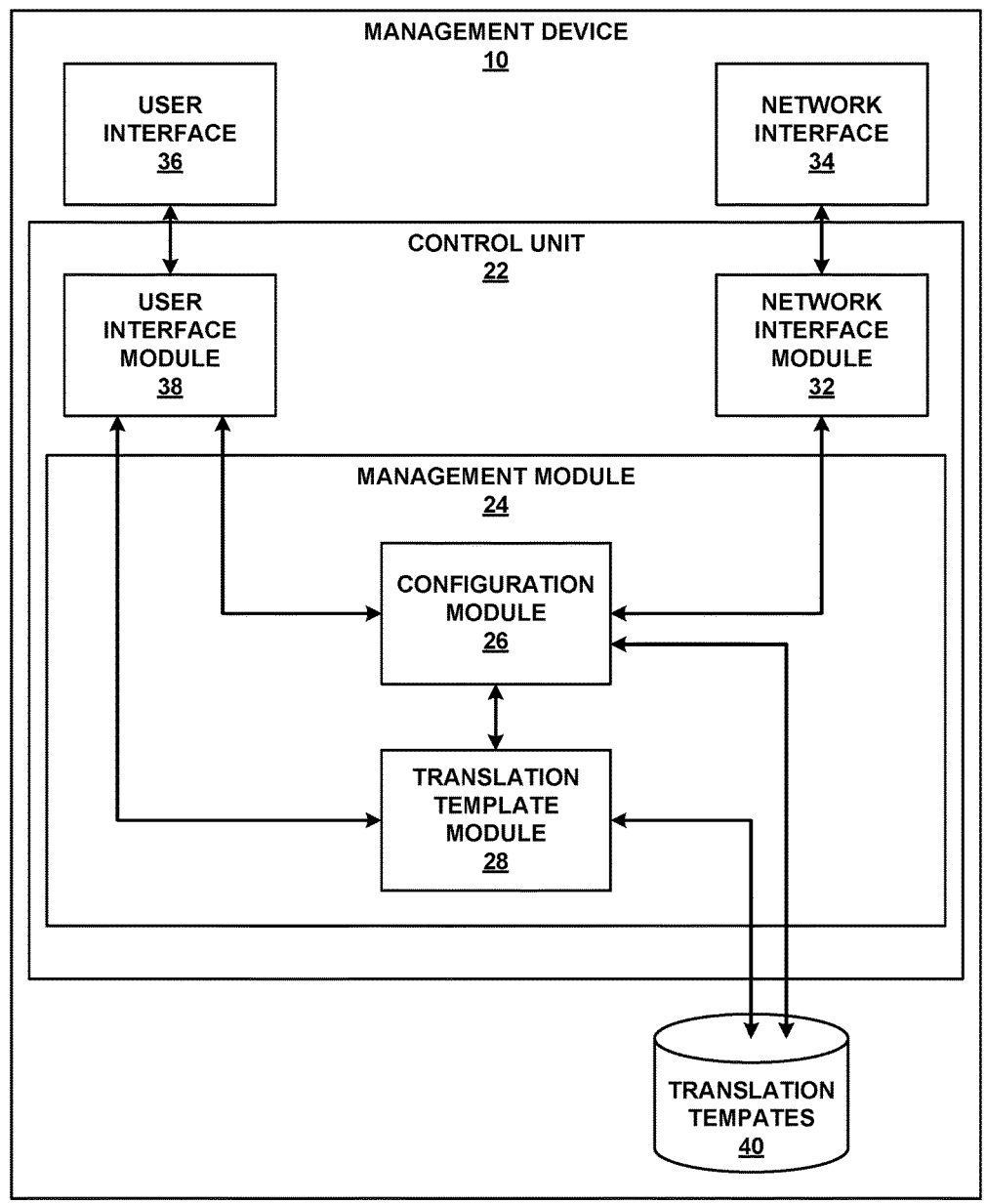
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrator 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation template module 28.

Management module 24 is configured to receive configuration instructions from a user, such as administrator 12. Over time, the user may update the configuration instructions, e.g., to add new services, remove existing services, or modify existing services performed by the managed devices. The instructions may be structured according to, e.g., YANG. In some examples, management module 24 also provides the user with the ability to submit custom services that translation template module 28 uses to generate device specific translation templates for new or otherwise currently unsupported devices, as discussed below.

Management device 10 also includes translation templates 40. Translation templates 40 generally includes vendor neutral to vendor specific translation templates for elements 14 as well as information about various YANG modules for elements 14 or copies of the YANG modules themselves. In some examples, translation templates 40 may include information about vendor neutral to vendor specific translation templates that support a new service configured by administrator 12 and which may be used for generating new translation templates for vendor devices included in elements 14 that do not currently support the new service. In general, the vendor neutral to vendor specific translation templates include information about a particular node in a particular module of the vendor specific model, information about a mapped node in a corresponding module of the vendor specific model, and information about the translation template itself including, in some examples, any translation template functions that may be used to map the vendor neutral node to the vendor specific node. In general, translation templates 40 may be a data repository stored in a memory or other storage medium of management device 10.

In accordance with the techniques of this disclosure, translation template module 28 may automatically generate vendor neutral to device specific translation templates to enable new devices added to network 2 to support for services provide by network 2 and, in some examples, to support new services configured by administrator 12. In instances where administrator 12 configures a new service, administrator 12 provides the service model for the new service as well as a translation template that maps the service model to the vendor neutral model. Rather than also requiring administrator 12 to provide a translation template from the vendor neutral model to each off the different device specific models to enable devices from each of the different vendors to support the new service, translation template module 28 may automatically generate the vendor neutral to vendor specific translation template, which may enable management device 10 to more easily configure elements 14 to support new services.

In instances where a new network device is added to network 2, administrator 12 may provide a device specific model for the new network device to management device 10. Using the device specific model and the vendor neutral model, translation template module 28 may automatically generate the vendor neutral to vendor specific translation template and may configure the new network device to support the services supported by the other network devices in network 2. In generating the vendor neutral to vendor specific translation template for the new device, translation template module 28 generates a similarity matrix that includes similarities between nodes of the vendor neutral model (i.e., source nodes) and nodes of the target device specific model (i.e., target nodes) by, for example, iterating through the nodes in the respective device model, identifying potentially matching nodes and generating or updating the similarity matrix. Translation template module 28 may search the search the target device model for a match to a particular node in the vendor neutral model, and may search the other device specific models for other network devices that already support the new service for a match. If a match is found in another device specific model that already supports the new service, translation template module 28 uses the corresponding vendor neutral schema translation template that maps the particular node from the vendor neutral model to the already supported device specific model, including any translation template functions that may be used by the other vendor devices for translation template with the vendor neutral model.

In instances where administrator 12 configures a new service, translation template module 28 analyzes the translation template from the service model to the vendor neutral model to identify the particular modules and nodes in the vendor neutral model that need to be added or modified in order to support the new service. For each device model that does not yet include support for the new service, mapping module 28 generates a new similarity matrix, iterates through the nodes in the respective device model, identifying potentially matching nodes and generating or updating a similarity matrix. Translation template module 28 searches the vendor neutral model for a match and then searches the other vendor device models that already support the new service for a match. If a match is found in another vendor device model that already supports the new service, mapping module 28 uses the corresponding vendor neutral schema mapping that maps the particular node from the vendor neutral model to the already supported vendor device model, including any mapping functions that may be used by the other vendor devices for mapping with the vendor neutral model.

In order to generate the translation template, translation template module 28 iterates through the device model for the to-be-supported vendor device. For each model, translation template module 28 identifies the particular module from the plurality of modules included in the device model for the to-be-mapped node(s) (i.e., the target module) and determines the similarity of the target nodes in the target module to the source node.

Translation template module 28 selects the particular module (e.g., YANG module) to analyze next from the target device model (i.e., the device model for the to-be-supported vendor device) based on module similarity. In order to determine the module similarity, translation template module determines the linguistic similarity between the name of the source module and the target module and determines the linguistic similarity between the source module description and the target module description. The term "linguistic similarity" refers to a semantic, phonetic, and/or lexical similarity. Translation template module 28 may determine the linguistic similarities using well-known techniques, such as Levenshtein distance calculations for phonetic and lexical similarity or distributional semantic techniques, such as latent semantic analysis, Hyperspace Analogue to Language syntax- or dependency-based models, etc., for semantic similarity.

Typically, the linguistic similarity is a value between 0 and 1 (inclusive) where the value 0 indicates that the words are not similar in any way and the value 1 indicates that the words are the same. Translation template module 28 may determine two different linguistic similarity scores—one for the name of the modules and one for the module descriptions. In some examples, translation template module 28 may apply different weightings to each of the linguistic similarity scores and may normalize result to be within the scoring range for either individual linguistic similarity score (e.g., between 0 and 1). Translation template module 28 may simply average the two scores, may apply a heavier (i.e., greater) weighting to the linguistic score for the name or description, etc.

Translation template module 28 determines the module similarity for all of the modules included in the target device model and, in some examples, analyzes each of the modules in descending order of similarity (i.e., most similar first to least similar last). For example, if translation template module 28 determines that a first target module (t1) has a module similarity score of 0.7, a second target module (t2) has a module similarity score of 0.1, a third target module (t3) has a module similarity score of 0.5, and a fourth target module (t4) has a module similarity score of 0.9, translation template module will search for the match to attribute 'a' by searching the target modules in the order t4, t1, t3, then t2. In various instances, translation template module 28 may be configured to generate the translation template by analyzing only the module with the highest similarity or only analyzing modules that have a module similarity score that is greater than a threshold score (e.g., greater than 0.7, 0.5, 0.3, etc.).

For each target module that translation template module 28 is configured to analyze, translation template module 28 traverses the tree structure of the particular target module and determines the similarity of each candidate node to the source node. For each candidate node in the target module, translation template module 28 determines the similarity by at least doing one or more of 1) determining a data type similarity, 2) determining a word distance between the attribute nodes, 3) determining the structural similarity of the sub-trees, 4) determining the linguistic similarity between the attribute names, 5) determining the linguistic similarity between the attribute descriptions, and 6) either determining the overall similarity based on the similarities of all of the ancestors of the particular node or, if the node includes the YANG container statement with "presence" (i.e., the particular node in the configuration has an explicit meaning). In instances where translation template module 28 performs two of more different similarity determinations, translation template module 28 may apply a respective weighting to each of the similarity scores to determine the overall similarity score. The respective weighting for a particular similarity score may be different from the respective weighting for a different similarity score.

In order to determine the data type similarity, translation template module 28 not only determines if the expressed types of the source node and target node are the same, but also analyzes characteristics associated with the nodes and respective data types. That is, translation template module 28 may determine a type similarity of the data of the node as well as a similarity of the metadata of the node. Translation template module 28 may determine the data type similarity based on one of a series of different possibilities. For example, if the source node and target node are not leaves and if the nodes have the same YANG data type, then translation template module 28 determines that the data type similarity score is 1 (i.e., perfect match). However, if the YANG container data types are not the same, then translation template module 28 determines that then data type similarity score is 0.2. Further, if only one of the nodes is a leaf node, then translation template module 28 determines that the data type similarity score is 0. (i.e., no match).

If the target and source nodes are both leaf nodes, then translation template module 28 analyzes the root type for user-defined types. If both leaf nodes are of the same root type, then translation template module determines that the data type similarity score is 1 unless both root types are of the integer family, then translation template module 28 determines that the type similarity score is 0.5. If only one of the source and target nodes has a string root type, then translation template module 28 determines that the similarity score is 0.2. Translation template module 28 may further analyze the other constructs of each node and determine similarity values for those other constructs, if they are present in the source and/or target nodes. If translation template module 28 determines that none of these situations exist between the source and target nodes (e.g., treating all of these possibilities as a "switch"-type statement), then translation template module 28 determines that the data type similarity score is 0.

In some examples, translation template module 28 may also determine the similarity of the metadata of the source and target nodes. In doing so, translation template module 28 may compare value ranges (if specified), default values (if specified), determine the linguistic similarity of each ENUM value for enumeration types, determine if the various attributes are mandatory or not in each of the source and target nodes, compare the units of values (if specified), compares lengths of values (if specified), compare regular expression patterns of values (if specified), compare the lengths of the XPATHS of corresponding attributes in the source and target nodes, etc. Translation template module 28 may also compare keys, min-elements, max-elements, order-by, and unique constructs during the metadata type similarity score computation. Each of these metadata type similarity scores (e.g., values between 0 and 1, inclusive) are then multiplied by a particular weighting assigned to each of the different metadata type comparisons and the resulting values are summed to determine the overall metadata type similarity score.

Translation template module 28 may combine the data type similarity score and the metadata type similarity score to determine the overall type similarity of the source and target nodes. In combining the data type and metadata type similarity scores, translation template module 28 may use the formula: overall type similarity=a*data type similarity score+overall metadata type similarity score where (a) is a constant determined based on the weightings given to each metadata similarity computation. For example, if the XPATH length similarity score is given a weighting of 0.2 and the other metadata similarity scores are given a weighting of 0.05 where there is a total of 4 other metadata similarity scores determines, the total value of the metadata types similarity score weightings is 0.4 (i.e., 0.2+0.05*4). The value of the constant (a) is determined by subtracting the sum of the metadata weightings from 1. Thus, in this example, the value of constant (a) is 0.6. Accordingly, in this example, the overall type similarity score is 0.6 times the data type similarity plus the overall metadata type similarity score.

Translation template module 28 also determines the word distance between the attribute names of the target and source nodes when the attribute names are appended with the names of the respective parent nodes. That is, if the source and target nodes have at least one ancestor node that has been analyzed, translation template module 28 appends the name of the parent node of the target and source nodes to the attribute name of the target and source nodes. That is, translation template module determines the word distance between the name of the parent node of the target node appended to the attribute name of the target node to the name of the parent node of the source node appended to the attribute name of the source node. In order to determine the word distance, translation template module 28 may use any known word distance algorithm and may determine the Levenshtein distance between the two words. The Levenshtein distance may be described as the minimum number of single-character edits (e.g., insertions, deletions, substitutions, etc.) required to change one word into the other word. Translation template module 28, in some examples, normalizes the calculated Levenshtein distances to be between the values of 0 and 1. For purposes of this disclosure, this particular Levenshtein distance will be referred to herein as the "name distance similarity score".

Translation template module 28 may also determine the structure similarity of the sub-trees of the target and source nodes. The sub-tree is the portion of the tree data structure that is lower than the particular node in question. That is, the sub-tree is the portion of the tree to which the particular node is the root node. Translation template module 28 applies a tree distance algorithm to determine the edit distance between the sub-tree of the target node and the sub-tree of the source node. Various examples of tree distance algorithms may be found in "Simple Fast Algorithms for the Editing Distance Between Trees and Related Problems" by Zahng and Shasha, Society for Industrial and Applied Mathematics, Volume 18, No. 6, pp. 1245-1262, December 1989, the entire contents of which are herein incorporated by reference. In general, the tree distance is the minimum cost sequence of node edit operations that transform one tree into another tree. In this example, the tree distance is the number of node edit operations that would be required to turn the sub-tree of the target node into the sub-tree of the source node or vice versa. Translation template module 28 may again normalize the determined tree distance to the inclusive range of 0 to 1. For purposed of this disclosure, this particular tree distance similarity score will be referred to herein as the "structural similarity score."

Translation template module 28 determines the linguistic similarity between the attribute names being compared. That is, translation template module 28 may not only compute the word distance between the two attribute names, as described above, but may also determine the distance between the meanings of the attribute names. In order to determine the linguistic similarities, translation template module 28 may use natural language processing libraries, such as word2vec, GENSIM, and NLTK. Translation template module 28 may normalize the linguistic similarity score to the inclusive range of 0 to 1. For purposed of this disclosure, this attribute name similarity score will be referred to herein as the "name similarity score."

In some examples, translation template module 28 may also determine the linguistic similarity between the attribute descriptions that are being compared. That is, translation template module 28 compares the descriptions of the target and source nodes to determine how linguistically similar the descriptions are to each other. In general, the descriptions are considered more similar if the target and source descriptions talk about the same subject. In some examples, translation template module 28 may determine the number of words that are in common between the two descriptions (excluding articles such as "a" and "the" and prepositions). Translation template module 28 may also determine the linguistic similarity between each word in one description (e.g., source description) and the words in the other description (e.g., target description), again excluding articles. The more words that the descriptions contain that are linguistically similar to each other, the more linguistically similar the descriptions as a whole are to each other. Similar to determining the linguistic similarity between the attribute names, translation template module 28 may use any number of different natural language processing libraries and may use a different natural language processing library than used to determine the linguistic similarity between the attribute names. Also, as with many of the other similarity scores discussed above, translation template module 28 may normalize the linguistic similarity score to the inclusive range of 0 to 1. For purposed of this disclosure, this attribute description similarity score will be referred to herein as the "description similarity score."

Translation template module 28 determines the total similarity score for the particular target and source node pair based on a combination of all or a subset of the above determined similarity scores. In some examples, translation template module 28 may determine one or more intermedia total similarity scores and, if the particular intermediate similarity score satisfies a threshold, may refrain from determining the other intermediary similarity scores and use particular intermediate similarity score as the similarity score for the target and source node pair.

For example, translation template module 28 may determine a first intermediate score based on the type similarity score, the name distance similarity score, and the structural similarity score. Translation template module 28 may apply a weighting to each store when determining the first intermediate score and may determine temporary intermediate values during the process of determining the first intermediate score. As one example, translation template module 28 may determine a first temporary intermediate value as follows: fti_value=(0.6*type similarity score)+(0.4*name distance similarity score). Translation template module 28 then determines the first immediate value as follow: fi_value=(0.6*fti_value)+(0.4*structural similarity score). Translation template module 28 may compare the first intermediate value to a first threshold value. If the first intermediate value satisfies the first threshold (e.g., fi_value >0.75), then translation template module 28 may refrain from performing any additional similarity value calculations for this particular target and source node pair and, instead, use the first intermediate value as the similarity score for this particular target and source node pair.

If the first intermediate value does not satisfy the first threshold, translation template module 28 may calculate a second intermediate value. The second intermediate value may be determined as follow: si_value=(0.6*fi_value)+ (0.4*name similarity score). In some examples, translation template module 28 may compare the second intermediate value to a second threshold (e.g., 0.7) and if the second intermediate value satisfies the second threshold, translation template module 28 may refrain from performing any additional similarity value calculations for this particular target and source node pair and, instead, use the second intermediate value as the similarity score for this particular target and source node pair.

If the second intermediate value does not satisfy the second threshold or if translation template module 28 is not configured to compare the second intermediate value to a second threshold prior to performing or attempting to perform additional similarity calculations, translation template module may determine a third intermediate value using the description similarity score. As one example, the third intermediate value is determined as follows: ti_value= (0.7*si_value)+(0.3*description similarity score). In some examples, this third intermediate score is used as the overall similarity score for the particular target and source node pair.

In some examples, translation template module 28 also computes the overall similarity score for the target and source node pair based on a combination of the similarity scores of all of the ancestors. In some examples, translation template module 28 only determines this overall similarity score for nodes that are leaves or YANG containers with "presence." Translation template module may apply different weights to each of the different similarity scores of the ancestor nodes and, as with the other weights described above, may adjust the weights to tweak the results and improve the accuracy of the process. As one example, translation template module 28 may determine the overall similarity score by averaging the similarity score of the current node with the similarity scores of each of its ancestor nodes. Translation template module 28 then adds or updates the similarity matrix to include the overall similarity score for the particular source and target node pair. This process is repeated and the overall similarity score is calculated for each of the source and target node pairs.

Once the similarity matrix is built by applying the above process to each of the target and source node pairs for each applicable module of the target model, translation template module 28 generates the translation template using the completed similarity matrix. Translation template module 28, for each respective source node, determines the particular target node that has the maximum similarity score for the respective source node and adds the translation template from the respective source node to the particular target node with the maximum similarity score to the translation template.

In some examples, translation template module 28 may determine if the maximum similarity score satisfies a threshold similarity score. For example, if the maximum similarity score is less than the predefined threshold similarity score (e.g., less than 0.5, 0.6, 0.7, etc.), translation template module 28 may mark the particular translation template as being error prone. That is, translation template module 28 adds the source to target translation template to the translation template even if the maximum similarity score is less than the threshold value, but flags the particular translation template as being error prone because it is less than the threshold value. In some examples, translation template module 28 may automatically validate the suggested translation templates by testing the input and output for those translation templates. If the input and output match, then translation template module 28 determines that it is a correct translation template and may remove the error prone marking.

In instances where translation template module 28 is not able to find an exact match for a particular source node, translation template module 28 may retrieve service models and the corresponding device models from administrator 12 and may assist the user in finding a match (e.g., by performing the actual translations of configuration from the service model to the device specific model). The corresponding device model refers to the particular existing device specific model for a particular service model that is already supported by the particular device. For example, for a first service supported by one of elements 14 of FIG. 1, management device 10 may receive (e.g., via administrator 12) or retrieve (e.g., from a storage device of management device 10) a service model for the first service as well as the device specific model that includes the configuration information required to support the first service. Using the service model and the device specific model for the first service, translation template module 28 may apply the above process to generate a suggested translation template for the nodes of the service model.

In some example, rather than or in addition to generating the suggested translation template, translation template module 28 may analyze an existing translation template that includes the translation template from the service model to the device specific model. In addition to using the existing service models, device specific models, and translation templates for the to-be-supported device, translation template module 28 may also analyze existing device specific models, and translation templates for other devices that already support the services provided by elements 14 of network 2. Translation template module 28 may search for nodes in the device specific models for the devices that already support the network services. If translation template module 28 finds at least one matching node, translation template module 28 may output, via user interface module 38 and user interface 36, a visual indication of the existing translation templates for the particular node as suggested translation templates for the particular node of the vendor neutral model. In this way, using the suggested translation template and/or the existing translation template, translation template module 28 may present suggested translation templates to administrator 12.

Once translation template module 28 generates the translation template from the service model to the device specific model, configuration module 26 generates the device specific configuration using the translation template. That is, configuration module 26 modifies values of the YANG module(s) of the device specific model for the to-be-supported device such that the device specific model includes the configuration information needed to support the network services (whether due to administrator 12 creating a new service or a new device being added to network 2). In some examples, configuration module 26 may compare the generated configuration information with device configurations of other devices that already support the network services. If there are is unmapped configuration information or any error prone translation templates, configuration module 26 may output, via user interface 36 and user interface module 38, information about the unmapped configuration information and error prone translation templates.

When outputting a graphical indication of the translation templates (e.g., to administrator 12 using user interface 36), configuration module 26 may visually highlight any translation templates marked as being error prone. Administrator 12 may review the automatically identified translation templates, including the error prone translation templates, and may manually revise the translation templates as needed. If administrator 12 determines that one of the suggested translation templates is incorrect, translation template module 12 may output, via user interface 36, other possible translation templates that may assist administrator 12 in quickly finding the correct translation template. Typically, translation template module 28 includes the translation templates with the next highest similarity scores in the other suggested translation templates. If administrator 12 identifies a correct translation template, configuration module 26 receives the input selecting the correct translation template and updates the map file. In some examples, a simple translation template may not be sufficient to correctly map the node from the vendor neutral model to the device specific model. Instead, administrator 12 may provide a custom translation template function that includes complex translation template logic. Using the user input, configuration module 26 updates the configuration information and causes translation template module 28 to update the translation template.

Processing all of the device specific models in this manner may be time consuming and inefficient. One way to improve the speed and efficiency of this approach is to compress the device specific and vendor neutral models. For example, prior to initiating the automatic map generation process, translation template module 28 may apply YANG flattening to the models. YANG flattening refers to the process of flattening the hierarchy of the nodes in the models by, for example removing YANG containers and including the children of the YANG containers in the parent lists. In this process, the XPATH is retained as the attribute names of the nodes are modified such that the updated attribute names include the names of the removed container parents. As another example, translation template module 28 may be configured to use leafref resolution during the map generation process. A leafref is a YANG built-in type that is used to reference a particular leaf instance in the tree. Thus, by using leafref resolution, translation template module 28 may more quickly identify the XPATH or other information for a particular node.

Once the translation template and configuration files are generated, management device 10 may send the configuration information to the to-be-supported device to enable the to-be-supported device to support the network services. That is, configuration module 26 may send, via network interface module 32 and network interface 34, configuration information to a to-be-supported device (e.g., element 14A of FIG. 1). Element 14A processes the configuration information and, once processed, supports the network services. In this way, management device 10 may enable support for the new service at a device that did not previously support the network services.

Figure 3A:
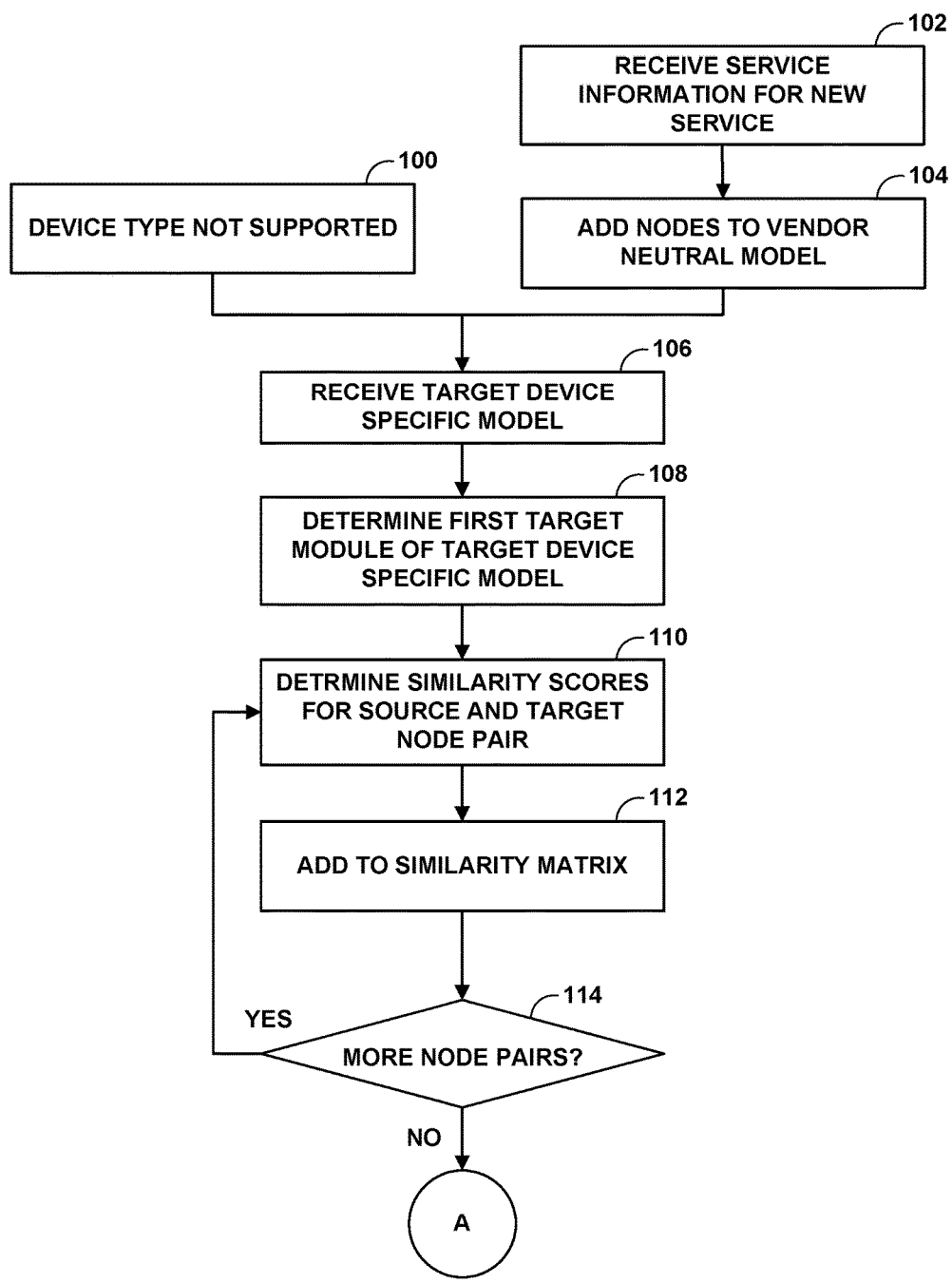
FIGS. 3A and 3B are a flowchart illustrating an example process for generating a vendor neutral to device specific translation template in accordance with techniques of this disclosure.
Figure 3B:
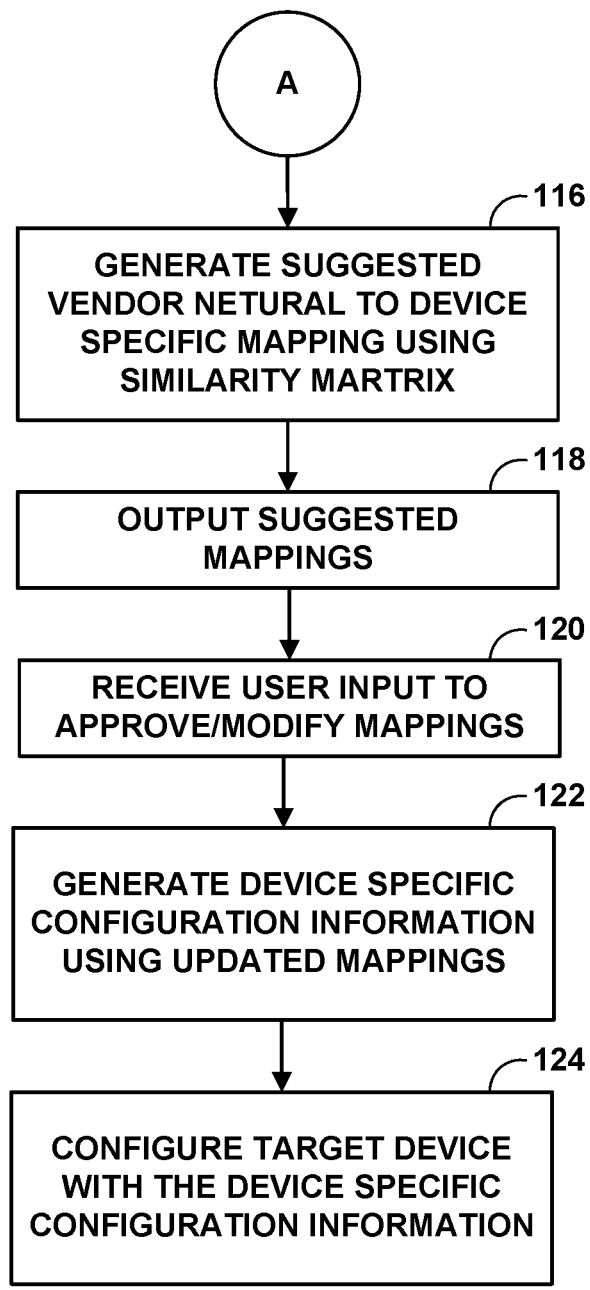

FIGS. 3A and 3B are a flowchart illustrating an example process for generating a vendor neutral to device specific translation template in accordance with techniques of this disclosure. The process of FIGS. 3A and 3B is explained with respect to management device 10 (representing an example of a network management system device) of FIGS. 1 and 2. However, it should be understood that other devices may be configured to perform this or a similar process.

In this example, initially, administrator 12 may want to add a new device to network 2 or configure elements 14 to support a new service. The new device may be a particular model or be a particular type of a device. If the new device is not already supported in the network (100), management device 10 may receive a device specific model for the new device (i.e., the target device) from administrator 12 via user interface 36 and/or network interface 34 (106). In some examples, management device 10 may retrieve the device specific model from a memory of management device 10 or from a remote network device (e.g., via network interface 34).

Management device 10 may determine that the device specific model does not include support for the services supported by network 2 and/or that a translation template for the new network device is not included within translation templates 40. In such instances, management device 10 may determine to generate a translation template for the new network device (i.e., the target network device). To generate the translation template, management device 10 may load a vendor neutral model in addition to the device specific model. The vendor neutral model is a set of configuration information that is not tied to a particular vendor or device. Instead, the vendor neutral model is a common set of configuration information that acts as an intermediary between vendor specific configuration information and service configuration information, which may simplify the process required to support network services.

If administrator 12 is configuring a new network service in network 2, management device 10 may receive service configuration information for the new network service from administrator 12 via an interface, such as network interface 34 or user interface 36 (102). The service configuration information includes a mapping from a service model to a vendor neutral model for the new network service. The new network service may not be supported by all of the different network devices (e.g., elements 14 of FIG. 1). Management device 10 may identify which ones of elements 14 do not currently support the particular network service and determine which of those elements 14 is the target device for providing support for the particular network service. Administrator 12 may specify which ones or elements 14 do not currently support the particular network service or management device 10 may automatically which elements 14 do not support the particular network services. Similarly, administrator 12 may specify the target network device or management device 10 may select one of elements 14 that does not support the particular network service as the target device.

Management device 10 may identify one or more modes that need to be added to the vendor neutral model in order to support the new service and add the identified nodes to the vendor neutral model (104). For example, management device 10 may analyze the service model and the mapping from the service model to the vendor neutral model that was provided by administrator 12. In some examples, administrator 12 provides management device 10 with information about the nodes that need to be added to the vendor neutral model and/or administrator 12 may provide an updated vendor neutral model that includes the nodes required to support the new network service. Regardless of how the nodes are identified, the nodes are added into the vendor neutral model such that management device 10 may generate the translation templates for elements 14 using the updated vendor neutral model.

In generating the translation template, for each module included in the vendor neutral model (i.e., for each source module), management device 10 determines a respective module similarity score for each of a plurality of modules of the target device specific model and determines a first target module of the target device specific model (108). For each source module, management device 10 may select a particular module having a highest value of the respective module similarity scores as the initial module to analyze. In various examples, management device 10 may analyze each of the modules in the target device specific model or any modules that have a module similarity score greater than a threshold score.

Each of the vendor neutral target device specific modules include respective sets of configuration information referred to herein as nodes. Source nodes are the nodes in the vendor neutral model that need to be updated or added in the target device specific model in order to enable the target network device to support the particular network service. Target nodes are the nodes in the target device specific model that may be mapped to the source nodes. Using the determined target module, management device 10 determines respective similarity scores for each unique source and target node pair (110). The similarity scores for each node may be determined based on various different similarity scores as described with respect to FIG. 2 above and FIG. 4 below.

For each unique source and target node pair, management device 10 determines the overall similarity score (110) and adds the overall similarity score to a similarity matrix (112). The similarity matrix includes source nodes on a first axis, target nodes on a second axis, and the determined similarity scores for each particular source and target node pair in the intersection of each source and target node. Thus, management device 10 may scan each of the source nodes on the first axis, then each of the target nodes on the second axis, and determine a score for the corresponding combination of source and target nodes. Determining the similarity score may include, for example, determining one or more of a data type similarity (i.e., determines how similar the data type of the source node is to the data type of the target node), a word distance between the source node attribute names and the target node attribute names, a structural similarity score of the sub-trees of the source node and target nodes, a linguistic similarity between the attribute names of the target and source nodes, a linguistic similarity between the attribute descriptions of the target and source nodes, or the overall similarity based on a combination of the determined similarity scores of all the ancestors.

If there are additional source and target node pairs for which management device 10 has not yet determined a similarity score ("YES" branch of 114), management device 10 selects another source and target node pair, determines the similarity score for that source and target nodes pair (110) and adds the resulting similarity scores to the similarity matrix (112). If management device 10 has determined similarity scores for all of the source and target node pairs ("NO" branch of 114), management device 10 generates a suggested vendor neutral model to device specific model translation template for each of the source nodes (116). Generally, management device 10 adds, for each source node, the particular source and target node pair having the highest similarity score in the similarity matrix as the suggested translation template for the particular source node. If none of the similarity scores for the source and target node pairs for a particular source node satisfy the threshold similarity score, management device 10 may still select the pair having the highest similarity score, but may also mark the particular translation template as an error prone translation template.

Management device 10 outputs a user interface that includes a graphical indication of the suggested translation templates (118). If one or more of the suggested translation templates are marked as being error prone, management device 10 may highlight or otherwise visually differentiate the error prone translation templates from the other translation templates. Administrator 12 may review the suggested translation templates and provide input to adjust or approve one or more of the suggested translation templates. Thus, management device 10 receives user input (e.g., from administrator 12) that approves or modifies the translation templates (120). Based on the user input, management device 10 maintains or updates the suggested translation templates.

Using the updated translation templates, management device 10 generates the device specific configuration information for the target device (122). The device specific configuration information may include the previous configuration information for the target device, but updated with the changes required to support the particular network services. Management device 10 configures the target network device using the device specific configuration information to enable the target network device to support the particular network service (124).

Figure 4:
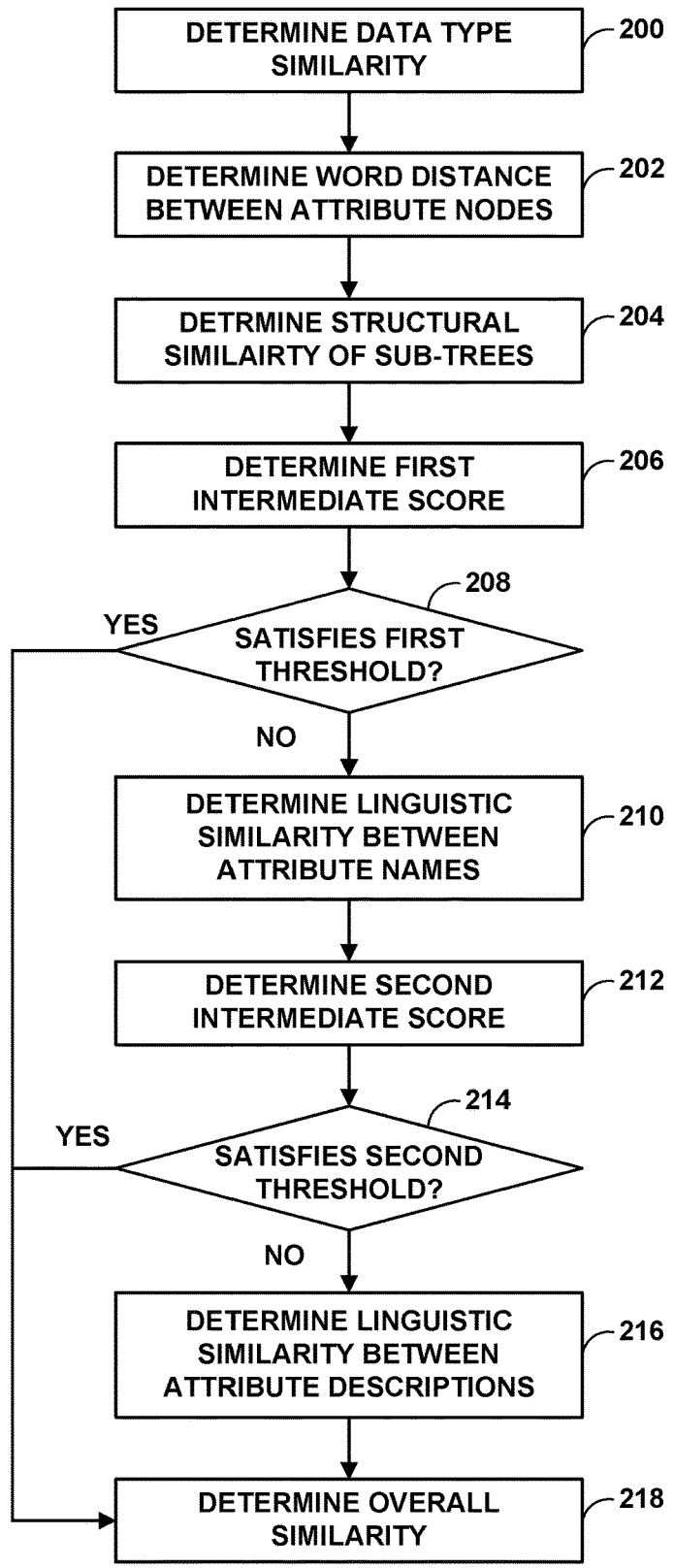
FIG. 4 is a flowchart illustrating an example process for determining the similarity score for source and target nodes in accordance with techniques of this disclosure.

FIG. 4 is a flowchart illustrating an example process for determining the similarity score for source and target nodes in accordance with techniques of this disclosure. The process of FIG. 4 is explained with respect to management device 10 (representing an example of a network management system device) of FIGS. 1 and 2. However, it should be understood that other devices may be configured to perform this or a similar process. An example source and target YANG files are provided below. As translation template module 28 generates the overall similarity score, example marked-up XML files showing the various scores are included below.

Below is an example source YANG file:

```
Module: p2p_source
    +--rw basic-settings
    |  +--rw comments?       string
    +--rw connectivity-settings
    |  +--rw firewall
    |  |  +--rw policer* [policer-name]
    |  |  |  +--rw policer-name      string
    |  |  |  +--rw if-exceeding!
    |  |  |  |  +--rw burst-size-limit    string
    |  |  |  |  +--rw (bandwidth)?
    |  |  |  |     +--: (bandwidth-limit)
    |  |  |  |        +--rw bandwidth-limit?    string
    |  |  |  +--rw then
    |  |  |     +--rw discard?    Empty
    |  +--rw family
    |  |  +--rw ccc
    |  |  |  +--rw filter* [filter-name]
    |  |  |     +--rw interface-specific?    empty
    |  |  |     +--rw term* [rule-name]
    |  |  |        +--rw rule-name      string
```

```
|   |   |       +--rw then
|   |   |           +--rw (accept)?
| +--rw interfaces
| | +--rw interface* [interface_name]
| |   +--rw mtu?            uint32
| |   +--rw encapsulation?      enumeration
| |   +--rw unit* [interace_unit_number]
| |      +--rw description?       string
| |      +--rw interface_unit_number    enumeration
| |      +--rw encapsulation      enumeration
| |      +--rw (vlan-id)?
| +--rw protocols
|    +--rw l2circuit
|       +--rw neighbor* [neighbor-id]
|          +--rw interface* [name]
|             +--rw mtu?        uint32
|             +--rw virtual-circuit-id   uint32
|             +--rw ignore-encapsulation-mismatch?   empty
+--rw endpoint
   +--rw firewall
   | +--rw policer* [policer-name]
   | | +--rw policer-name     string
   | +--rw family
   |    +--rw ccc
   |       +--rw filter* [filter-name]
   |          +--rw term* [rule-name]
   |          | +--rw then
   |          |    +--rw (policer)?
   |          +--rw filter-name     string
   +--rw interfaces
   | +--rw interface* [interface_name]
   |    +--rw unit* [interface_unit_number]
   |    | +--rw family
   |    |    +--rw ccc!
   |    |       +--rw filter
   |    |          +--rw (input)?
   |    +--rw interface_name     enumeration
   | +--rw protocols
      +--rw l2circuit
         +--rw neighbor* [neighbor-id]
            +--rw neighbor-id    ipv4addr
            +--rw interface* [name]
               +-- rw name     interface-name
```

Below is an example target YANG file:

```
module: p2p_destination
         +--rw non-existent-parent
         |   +--rw general-config
         |      +--rw comment-str?     String
         +--rw if-firewall-config
         | +--rw acl
         |  +--rw policer* [name]
         |  | +--rw name       String
         |  | +--rw exceeds
         |  | | +--rw burst-size      string
         |  | +--rw then-drop?    Empty
         |  +--rw acl* [name]
         |    +--rw interface-specific-settings?    empty
         |    +--rw rule* [rule-name]
         |       +--rw name?     string
         |       +--rw then
         |          +--rw (allow)?
         +--rw if-cfgs
         | +--rw if-settings* [interace_name]
         |    +--rw mtu?     uint32
         |    +--rw acl-bw-limit?     string
         |    +--rw encapsulation?    enumeration
         |    +--rw unit* [interface_unit_number]
         |       +--rw description?    String
         +--rw pseudowire-cfg
         | +--rw pseudowire
         |    +--rw neighbor* [neighbor-id]
         |       +--rw if* [name]
         |       | +--rw name     if-name
         |       | +--rw mtu?    uint32
         |       | +--rw VC-id    uint32
```

```
    |    +--rw neighor_identifier?     Ipv4address
    +--rw device-a
    | +--rw filter* [filter-name]
       +--rw rulw* [policer]
       | +--rw policer      string
       +--rw name?     string
```

For each module of the vendor and target models, translation template module 28 determines a data type similarity (200). Translation template module 28 may determine the data type similarity based on one of a series of different possibilities. For example, if the source node and target node are not leaves and if the nodes have the same YANG data type, then translation template module 28 determines that the data type similarity score is 1 (i.e., perfect match). However, if the YANG container data types are not the same, then translation template module 28 determines that then data type similarity score is 0.2. Further, if only one of the nodes is a leaf node, then translation template module 28 determines that the data type similarity score is 0. (i.e., no match).

If the target and source nodes are both leaf nodes, then translation template module 28 analyzes the root type for user-defined types. If both leaf nodes are of the same root type, then translation template module determines that the data type similarity score is 1 unless both root types are of the integer family, then translation template module 28 determines that the type similarity score is 0.5. If only one of the source and target nodes has a string root type, then translation template module 28 determines that the similarity score is 0.2. Translation template module 28 may further analyze the other constructs of each node and determine similarity values for those other constructs, if they are present in the source and/or target nodes. If translation template module 28 determines that none of these situations exist between the source and target nodes (e.g., treating all of these possibilities as a "switch"-type statement), then translation template module 28 determines that the data type similarity score is 0.

In some examples, translation template module 28 may also determine the similarity of the metadata of the source and target nodes. In doing so, translation template module 28 may compare value ranges (if specified), default values (if specified), determine the linguistic similarity of each ENUM value for enumeration types, determine if the various attributes are mandatory or not in each of the source and target nodes, compare the units of values (if specified), compares lengths of values (if specified), compare regular expression patterns of values (if specified), compare the lengths of the XPATHS of corresponding attributes in the source and target nodes, etc. Translation template module 28 may also compare keys, min-elements, max-elements, order-by, and unique constructs during the metadata type similarity score computation. Each of these metadata type similarity scores (e.g., values between 0 and 1, inclusive) are then multiplied by a particular weighting assigned to each of the different metadata type comparisons and the resulting values are summed to determine the overall metadata type similarity score.

Translation template module 28 may combine the data type similarity score and the metadata type similarity score to determine the overall type similarity of the source and target nodes. In combining the data type and metadata type similarity scores, translation template module 28 may use the formula: overall type similarity=a*data type similarity score+overall metadata type similarity score where (a) is a constant determined based on the weightings given to each metadata similarity computation. For example, if the XPATH length similarity score is given a weighting of 0.2 and the other metadata similarity scores are given a weighting of 0.05 where there is a total of 4 other metadata similarity scores determines, the total value of the metadata types similarity score weightings is 0.4 (i.e., 0.2+0.05*4). The value of the constant (a) is determined by subtracting the sum of the metadata weightings from 1. Thus, in this example, the value of constant (a) is 0.6. Accordingly, in this example, the overall type similarity score is 0.6 times the data type similarity plus the overall metadata type similarity score.

Using the example source and target YANG files provided above, the result following the determination of the type similarity is as follows:

```
<p2p_destination>
  <if-firewall-config>
    <acl>
      <policer>
        <exceeds>
          <burst-size>{/p2p_source/connectivity-settings/firewall/
policer/if-exceeding/burst-size-limit(0.736666666667 <!-- this is the
similarity between the source and target paths -->/ 0.687968783069 <!--
this is the similarity threshold -->):p2p_source/connectivity-settings/
firewall/family/ccc/filter/term/rule-name(0.721785714286):p2p_source/
endpoint/firewall/family/ccc/filter/filter-name(0.716825396825)}</burst-
size>
        </exceeds>
        <then-drop>{/p2p_source/connectivity-settings/firewall/family/
ccc/filter/interface-specific(0.704761904762/ 0.687968783069 <!-- this is
a wrong mapping after this step -->):p2p_source/connectivity-settings/
protocols/l2circuit/neighbor/interface/ignore-encapsulation-mismatch
(0.698095238095):p2p_source/connectivity-settings/firewall/policer/then/
discard(0.686666666667)}</then-drop>
        <name>{/p2p_source/connectivity-settings/firewall/family/ccc/
filter/term/rule-name(0.712142857143/ 0.687968783069 <!-- this is a
wrong mapping after this step -->):p2p_source/endpoint/firewall/family/
ccc/filter/filter-name(0.704761904762):p2p_source/connectivity-settings/
firewall/policer/if-exceeding/bandwidth/bandwidth-limit
(0.677142857143)}</name>
      </policer>
      <acl>
        <interface-specific-settings>{/p2p_source/connectivity-settings/
firewall/family/ccc/filter/interface-specific(0.704761904762/
0.687968783069):p2p_source/connectivity-settings/protocols/l2circuit/
neighbor/interface/ignore-encapsulation-mismatch(0.698095238095):
p2p_source/connectivity-settings/firewall/policer/then/discard
(0.686666666667) <!-- each mapping includes the top three matches based
on similarity -->}</interface-specific-settings>
        <rule>
          <name>{/p2p_source/connectivity-settings/firewall/family/ccc/
filter/term/rule-name(0.732142857143/ 0.687968783069):p2p_source/
endpoint/firewall/family/ccc/filter/filter-name(0.721428571429):
p2p_source/connectivity-settings/firewall/policer/if-exceeding/bandwidth/
bandwidth-limit(0.70130952381)}</name>
        </rule>
      </acl>
    </acl>
  </if-firewall-config>
  <non-existent-parent>
    <general-config>
      <comment-str>{/p2p_source/connectivity-settings/firewall/
family/ccc/filter/term/rule-name?(0.675/ 0.687968783069 <!-- this is a
match having a similarity value less than the threshold -->):p2p_source/
endpoint/firewall/family/ccc/filter/filter-name?(0.671428571429 <!-- this
is a wrong mapping after this step -->):p2p_source/connectivity-settings/
firewall/policer/if-exceeding/bandwidth/bandwidth-limit?
(0.650892857143)}</comment-str>
    </general-config>
  </non-existent-parent>
  <device-a>
    <filter>
      <rule>
        <policer>{/p2p_source/connectivity-settings/firewall/family/
ccc/filter/term/rule-name(0.719/ 0.687968783069 <!-- this is a wrong
mapping after this step -->):p2p_source/endpoint/firewall/family/ccc/
filter/filter-name(0.708761904762):p2p_source/connectivity-settings/
firewall/policer/if-exceeding/bandwidth/bandwidth-limit
(0.671142857143)}</policer>
        <name>{/p2p_source/connectivity-settings/firewall/family/ccc/
filter/term/rule-name?(0.683571428571/ 0.687968783069 <!-- this is a
wrong mapping after this step -->):p2p_source/endpoint/firewall/family/
ccc/filter/filter-name?(0.676428571429):p2p_source/connectivity-
settings/firewall/policer/if-exceedingbandwidth/bandwidth-limit?
(0.643392857143)}</name>
      </rule>
    </filter>
  </device-a>
  <pseudowire-cfg>
    <pseudowire>
      <neighbor>
        <if>
          <VC-id>{/p2p_source/connectivity-settings/protocols/
l2circuit/neighbor/interface/virtual-circuit-id(0.726587301587/
0.687968783069):p2p_source/connectivity-settings/protocols/l2circuit/
neighbor/interface/mtu(0.705753968254):p2p_source/connectivity-
settings/interfaces/interface/mtu(0.690694444444)}</VC-id>
          <name>{/p2p_source/connectivity-settings/firewall/family/
ccc/filter/term/rule-name?(0.625476190476/ 0.687968783069 <!-- this is
a wrong mapping after this step -->):p2p_source/endpoint/firewall/family/
ccc/filter/filter-name?(0.614761904762):p2p_source/connectivity-settings/
firewall/family/ccc/filter/interface-specific?(0.605555555556)}</name>
          <mtu>{(/p2p_source/connectivity-settings/protocols/l2circuit/
neighbor/interface/mtu(0.715873015873/ 0.687968783069 <!-- this is a
wrong mapping after this step -->):p2p source/connectivity-settings/
protocols/l2circuit/neighbor/interface/virtual-circuit-id(0.705753968254):
p2p_source/connectivity-settings/interfaces/interface/mtu
(0.701111111111)}</mtu>
        </if>
        <neighbor_identifier>{/p2p_source/connectivity-settings/firewall/
family/ccc/filter/term/rule-name?(0.584142857143/ 0.687968783069):
p2p_source/endpoint/firewall/family/ccc/filter/filter-name?
(0.576761904762):p2p_source/connectivity-settings/firewall/family/ccc/
filter/interface-specific?(0.557333333333) <!-- this is a wrong mapping
after this step -->}</neighbor_identifier>
      </neighbor>
    </pseudowire>
  </pseudowire-cfg>
  <if-cfgs>
    <if-settings>
      <encapsulation>{/p2p_source/connectivity-settings/interfaces/
interface/unit/encapsulation?(0.653333333333/ 0.687968783069):
p2p_source/connectivity-settings/interfaces/interface/unit/interface_unit_
number?(0.653333333333):p2p_source/connectivity-settings/interfaces/
interface/encapsulation?(0.639166666667)}</encapsulation>
      <mtu>{/p2p_source/connectivity-settings/protocols/l2circuit/
neighbor/interface/mtu?(0.671428571429/ 0.687968783069):p2p_source/
connectivity-settings/protocols/l2circuit/neighbor/interface/virtual-circuit-
id?(0.650892857143).p2p_source/connectivity-settings/interfaces/
interface/mtu?(0.639166666667)}</mtu>
      <acl-bw-limit>{/p2p_source/connectivity-settings/firewall/
policer/if-exceeding/bandwidth/bandwidth-limit?(0.674642857143/
0.687968783069):p2p_source/connectivity-settings/firewall/family/ccc/
filter/term/rule-name?(0.661696428571):p2p_source/endpoint/firewall/
family/ccc/filter/filter-name?(0.655892857143)}</acl-bw-limit>
    </if-settings>
  </if-cfgs>
</p2p_destination>
```

Translation template module 28 also determines the word distance between the attribute names of the target and source nodes when the attribute names are appended with the names of the respective parent nodes (202). In order to determine the word distance, translation template module 28 may determine the Levenshtein distance between the two words. Translation template module 28, in some examples, normalizes the calculated Levenshtein distances to be between the values of 0 and 1.

Continuing the example using the example source and target YANG files provided above, the result following the determination of the name similarity is as follows:

```
<p2p_destination>
  <if/firewall-config>
    <acl>
      <policer>
        <exceeds>
          <burst-size>{/p2p_source/connectivity-
settings/firewall/policer/if-exceeding/burst-size-limit(0.64/
0.576759991983):p2p_source/connectivity-settings/firewall/policer/if-
exceeding/bandwidth/bandwidth-limit(0.586613756614):p2p_source/
connectivity-settings/firewall/policer/policer-name(0.57032010582)}
</burst-size>
        </exceeds>
        <then-drop>{/p2p_source/connectivity-settings/firewall/
policer/then/discard(0.595603174603/ 0.576759991983):p2p_source/
connectivity-settings/firewall/family/ccc/filter/interface-specific
(0.54068994709):p2p_source/connectivity-settings/firewall/policer/
if-exceeding/burst-size-limit(0.50026031746)}</then-drop>
        <name>{/p2p_source/connectivity-settings/firewall/policer/
policer-name(0.625888888889/ 0.576759991983):p2p_source/endpoint/
firewall/policer/policer-name(0.6045):p2p_source/connectivity-settings/
firewall/family/ccc/filter/term/rule-name(0.573203174603)}</name>
      </policer>
      <acl>
        <interface-specific-settings>{/p2p_source/connectivity-settings/
firewall/family/ccc/filter/interface-specific?(0.560901587302/
0.576759991983):p2p_source/connectivity-settings/protocols/l2circuit/
neighbor/interface/ignore-encapsulation-mismatch?(0.504196692197):
p2p_source/connectivity-settings/firewall/policer/then/discard?
(0.491317460317)}</interface-specific-settings>
        <rule>
          <name>{/p2p_source/connectivity-settings/firewall/family/
ccc/filter/term/rule-name(0.587074074074/ 0.576759991983):
p2p_source/endpoint/firewall/family/ccc/filter/filter-name
(0.558634920635):p2p_source/connectivity-settings/firewall/policer/
policer-name(0.547002645503)}</name>
        </rule>
      </acl>
    </acl>
  </if-firewall-config>
  <non-existent-parent>
    <general-config>
      <comment-str>{/p2p_source/basic-settings/comments?
(0.476325757576/ 0.576759991983):p2p_source/connectivity-settings/
firewall/family/ccc/filter/term/rule-name?(0.469534632035):p2p_source/
endpoint/firewall/family/ccc/filter/filter-name?(0.460892857143)}
</comment-str>
    </general-config>
  </non-existent-parent>
  <device-a>
    <filter>
      <rule>
        <policer>{/p2p_source/connectivity-settings/firewall/family/
ccc/filter/term/rule-name(0.632558441558/ 0.576759991983):p2p_source/
endpoint/firewall/family/ccc/filter/filter-name(0.600222222222) <!-- this
is a wrong mapping after this step -->:p2p_source/endpoint/firewall/
policer/policer-name(0.543650793651)}</policer>
      </rule>
      <name>{/p2p_source/endpoint/firewall/family/ccc/filter/filter-
name(0.640634920635/ 0.576759991983):p2p_source/connectivity-
settings/firewall/family/ccc/filter/term/rule-name(0.599090909091):
p2p_source/endpoint/firewall/policer/policer-name(0.540563492063)}
</name>
    </filter>
  </device-a>
  <pseudowire-cfg>
    <pseudowire>
      <neighbor>
        <if>
          <VC-id>{/p2p_source/connectivity-settings/protocols/
l2circuit/neighbor/interface/virtual-circuit-id(0.601991822992/
0.576759991983):p2p_source/connectivity-settings/protocols/l2circuit/
neighbor/interface/mtu(0.565858666025):p2p_source/endpoint/protocols/
l2circuit/neighbor/neighbor-id(0.518537037037)}</VC-id>
          <name>{/p2p_source/endpoint/protocols/l2circuit/neighbor/
interface/name?(0.557597883598/ 0.576759991983):p2p_source/
connectivity-settings/protocols/l2circuit/neighbor/interface/ignore-
encapsulation-mismatch?(0.506356902357):p2p_source/connectivity-
settings/protocols/l2circuit/neighbor/interface/mtu?(0.506356902357)}
</name>
          <mtu>{/p2p_source/connectivity-settings/protocols/l2circuit/
neighbor/interface/mtu(0.633658489658/ 0.576759991983) <!-- this is a
```

-continued

```
wrong mapping after this step -->:p2p_source/connectivity-settings/
protocols/l2circuit/neighbor/interface/virtual-circuit-id(0.578380711881):
p2p_source/connectivity-settings/interfaces/interface/mtu
(0.548579124579)}</mtu>
          </if>
          <neighbor_identifier>{/p2p_source/endpoint/protocols/l2circuit/
neighbor/interface/name?(0.4928/ 0.576759991983) <!--this is a wrong
mapping after this step -->: p2p_source/endpoint/protocols/l2circuit/
neighbor/neighbor-id?(0.4888):p2p_source/connectivity-settings/
protocols/l2circuit/neighbor/interface/ignore-encapsulation-mismatch?
(0.488072727273)}</neighbor_identifier>
        </neighbor>
      </pseudowire>
    </pseudowire-cfg>
    <if-cfgs>
      <if-settings>
        <encapsulation>{/p2p_source/connectivity-settings/interfaces/
interface/unit/encapsulation?(0.546141414141/ 0.576759991983) <!--
this is a wrong mapping after this step -->:p2p_source/connectivity-
settings/interfaces/interface/encapsulation?(0.535141414141):p2p_source/
connectivity-settings/interfaces/interface/unit/interface_unit_number?
(0.46701036001)}</encapsulation>
        <mtu>{/p2p_source/connectivity-settings/protocols/l2circuit/
neighbor/interface/mtu?(0.545748556999/ 0.576759991983):p2p_source/
connectivity-settings/interfaces/interface/mtu?(0.535141414141):
p2p_source/connectivity-settings/protocols/l2circuit/neighbor/interface/
virtual-circuit-id?(0.46437950938)}</mtu>
        <acl-bw-limit>{/p2p_source/connectivity-settings/firewall/policer/
if-exceeding/bandwidth/bandwidth-limit?(0.514474867725/
0.576759991983):p2p_source/connectivity-settings/firewall/policer/if-
exceeding/burst-size-limit?(0.500115079365):p2p_source/connectivity-
settings/firewall/family/ccc/filter/term/rule-name?(0.450798160173)}
</acl-bw-limit>
      </if-settings>
    </if-cfgs>
</p2p_destination>
```

Translation template module 28 may also determine the structure similarity score of the sub-trees of the target and source nodes (204). Translation template module 28 applies a tree distance algorithm to determine the edit distance between the sub-tree of the target node and the sub-tree of the source node. this example, the tree distance is the number of node edit operations that would be required to turn the sub-tree of the target node into the sub-tree of the source node or vice versa. Translation template module 28 may again normalize the determined tree distance to the inclusive range of 0 to 1.

Continuing the example using the example source and target YANG files provided above, the result following the determination of the structure similarity is as follows:

```
<p2p_destination>
  <if-firewall-config>
    <acl>
      <policer>
        <exceeds>
          <burst-size>{/p2p_source/connectivity-settings/firewall/
policer/ifexceeding/burst-size-limit(0.599251633987/ 0.578411888842):
p2p_source/connectivity-settings/firewall/policer/if-exceeding/bandwidth/
bandwidth-limit(0.545865390601):p2p_source/connectivity-settings/
firewall/policer/then/discard(0.534378618114)}</burst-size>
        </exceeds>
        <then-drop>{/p2p_source/connectivity-settings/firewall/policer/
then/discard?(0.573882913165/ 0.578411888842):p2p_source/
connectivity-settings/firewall/family/ccc/filter/interface-specific?
(0.546122066604):p2p_source/connectivity-settings/firewall/policer/
if-exceeding/bandwidth/bandwidth-limit?(0.47818767507)}</then-drop>
          <name>{(/p2p_source/connectivity-settings/firewall/policer/
policer-name(0.604168627451/ 0.578411888842):p2p_source/
connectivity-settings/firewall/family/ccc/filter/term/rule-name
(0.578635294118):p2p_source/connectivity-settings/firewall/policer/
if-exceeding/bandwidth/bandwidth-limit(0.53832735761)}</name>
      </policer>
```

```
        <acl>
            <interface-specific-settings>{/p2p_source/connectivity-settings/
firewall/ccc/filter/interface-specific(0.58804799253/
0.578411888842):p2p_source/connectivity-settings/firewall/policer/then/
discard(0.507025770308):p2p_source/connectivity-settings/firewall/
family/ccc/filter/term/rule-name(0.474872331155)}</interface-specific-
settings>
            <rule>
                <name>(/p2p_source/connectivity-settings/firewall/family/ccc/
filter/term/rule-name(0.628902427638/ 0.578411888842):p2p_source/
connectivity-settings/firewall/policer/policer-name(0.552207189542):
p2p_source/connectivity-settings/firewall/policer/if-exceeding/bandwidth/
bandwidth-limit(0.513172798008)}</name>
            </rule>
        </acl>
    </if-firewall-config>
    <non-existent-parent>
        <general-config>
            <comment-str>{/p2p_source/basic-settings/comments?
(0.520962121212/ 0.578411888842):p2p_source/connectivity-settings/
firewall/policer/if-exceeding/bandwidth/bandwidth-limit?
(0.454400793651):p2p_source/connectivity-settings/firewall/policer/
if-exceeding/burst-size-limit?(0.444261904762)}</comment-str>
        </general-config>
    </non-existent-parent>
    <device-a>
        <filter>
            <rule>
                <policer>{/p2p_source/endpoint/firewall/family/ccc/filter/
filter-name?(0.566106666667/ 0.578411888842):p2p_source/
connectivity-settings/firewall/family/ccc/filter/term/rule-name?
(0.538763809524) <!-- this is a wrong mapping after this step -->:
p2p_source/endpoint/firewall/policer/policer-name?(0.530057142857)}
</policer>
            </rule>
            <name>{/p2p_source/endpoint/firewall/family/ccc/filter/filter-
name(0.62999047619/ 0.578411888842):p2p_source/connectivity-
settings/firewall/family/ccc/filter/term/rule-name(0.511657142857):
p2p_source/endpoint/firewall/policer/policer-name(0.485142857143)}
</name>
        </filter>
    </device-a>
    <pseudowire-cfg>
        <pseudowire>
            <neighbor>
                <if>
                    <VC-id>{/p2p_source/connectivity-settings/protocols/
l2circuit/neighbor/interface/virtual-circuit-id(0.636925252525/
0.578411888842):p2p_source/connectivity-settings/protocols/l2circuit/
neighbor/interface/mtu(0.600792095559):p2p_source/connectivity-
settings/protocols/l2circuit/neighbor/interface/ignore-encapsulation-
mismatch(0.540456998557)}</VC-id>
                    <name>{/p2p_source/connectivity-settings/protocols/
l2circuit/neighbor/interface/ignore-encapsulation-mismatch?
(0.549068109668/ 0.578411888842):p2p_source/connectivity-settings/
protocols/l2circuit/neighbor/interface/mtu?(0.549068109668):p2p_source/
connectivity-settings/protocols/l2circuit/neighbor/interface/virtual-circuit-
id?(0.549068109668) <!-- this is a wrong mapping after this step -->}
</name>
                    <mtu>{/p2p_source/connectivity-settings/protocols/l2circuit/
neighbor/interface/mtu(0.668591919192/ 0.578411888842):p2p_source/
connectivity-settings/protocols/l2circuit/neighbor/interface/virtual-circuit-
id(0.613314141414):p2p_source/connectivity-settings/protocols/l2circuit/
neighbor/interface/ignore-encapsulation-mismatch(0.542679220779)}
</mtu>
                </if>
                <neighbor_identifier>{/p2p_source/connectivity-settings/
protocols/l2circuit/neighbor/interface/ignore-encapsulation-mismatch?
(0.507148398268/ 0.578411888842):p2p_source/connectivity-settings/
protocols/l2circuit/neighbor/interface/mtu?(0.507148398268):p2p_source/
connectivity-settings/protocols/l2circuit/neighbor/interface/virtual-circuit-
id?(0.507148398268) <!-- this is a wrong mapping after this step -->}
</neighbor_identifier>
            </neighbor>
        </pseudowire>
    </pseudowire-cfg>
    <if-cfgs>
        <if-settings>
            <encapsulation>{/p2p_source/connectivity-settings/interfaces/
interface/unit/encapsulation?(0.55121010101/ 0.578411888842) <!-- this
is a wrong mapping after this step -->:p2p_source/connectivity-settings/
interfaces/interface/encapsulation?(0.509676767677):p2p_source/
connectivity-settings/interfaces/interface/unit/interface_unit_number?
(0.472079046879)}</encapsulation>
            <mtu>/p2p_source/connectivity-settings/protocols/l2circuit/
neighbor/interface/mtu?(0.539083333333/ 0.578411888842):p2p_source/
connectivity-settings/interfaces/interface/mtu?(0.509676767677):
p2p_source/connectivity-settings/protocols/l2circuit/neighbor/interface/
virtual-circuit-id?(0.457714285714)}</mtu>
            <acl-bw-limit>{/p2p_source/connectivity-settings/firewall/policer/
if-exceeding/bandwidth/bandwidth-limit?(0.512838359788/
0.578411888842):p2p_source/connectivity-settings/firewall/policer/
if-exceeding/burst-size-limit?(0.498478571429):p2p_source/connectivity-
settings/firewall/family/ccc/filter/term/rule-name?(0.462972619048)}
</acl-bw-limit>
        </if-settings>
    </if-cfgs>
</p2p_destination>
```

In some examples, prior to determining any additional similarity sub-scores, translation template module 28 may determine a first intermediate score based on the type similarity score, the name distance similarity score, and the structural similarity score (206). Translation template module 28 may apply a weighting to each store when determining the first intermediate score and may determine temporary intermediate values during the process of determining the first intermediate score. As one example, translation template module 28 may determine a first temporary intermediate value as follows: fti_value=(0.6*type similarity score)+(0.4*name distance similarity score). Translation template module 28 then determines the first immediate value as follow: fi_value=(0.6*fti_value)+(0.4*structural similarity score). Translation template module 28 may compare the first intermediate value to a first threshold value (308). If the first intermediate value satisfies the first threshold (e.g., fi_value >0.75) ("YES" branch of 208), then translation template module 28 may refrain from performing any additional similarity value calculations for this particular target and source node pair and, instead, use the first intermediate value as the overall similarity score for this particular target and source node pair (218).

If the first intermediate value does not satisfy the first threshold ("NO" branch of 208), translation template module 28 may determine the linguistic similarity between the attribute names being compared (210). That is, translation template module 28 may not only compute the word distance between the two attribute names, as described above, but may also determine the distance between the meanings of the attribute names. In order to determine the linguistic similarities, translation template module 28 may use natural language processing libraries, such as word2vec, GENSIM, and NLTK. Translation template module 28 may normalize the linguistic name similarity score to the inclusive range of 0 to 1.

Continuing the example using the example source and target YANG files provided above, the result following the determination of the attribute name linguistic similarity is as follows:

```
<p2p_destination>
    <if-firewall-config>
        <acl>
            <policer>
                <exceeds>
```

```
            <burst-size>{/p2p_source/connectivity-settings/firewall/
policer/if-exceeding/burst-size-limit(0.573717647059/ 0.518807453251):
p2p_source/connectivity-settings/firewall/policer/if-exceeding/bandwidth/
bandwidth-limit(0.506871086212):p2p_source/connectivity-settings/
firewall/policer/then/discard(0.496486959228)}</burst-size>
          </exceeds>
          <then-drop>{/p2p_source/connectivity-settings/firewall/policer/
then/discard(0.543932922502/ 0.518807453251):p2p_source/
connectivity-settings/firewall/policer/if-exceeding/burst-size-limit
(0.472296943666):p2p_source/connectivity-settings/firewall/policer/
if-exceeding/bandwidth/bandwidth-limit(0.472296943666)}</then-drop>
          <name>{(/p2p_source/connectivity-settings/firewall/policer/
policer-name(0.596390065359/ 0.518807453251):p2p_source/endpoint/
firewall/policer-name(0.522329230769)p2p_source/connectivity-settings/
firewall/family/ccc/filter/term/rule-name(0.506784351074)}</name>
        </policer>
        <acl>
          <interface-specific-settings>{/p2p_source/connectivity-settings/
firewall/family/ccc/filter/interface-specific?(0.502273239963/
0.518807453251):p2p_source/connectivity-settings/firewall/family/ccc/
filter/term/rule-name?(0.403697742919):p2p_source/connectivity-settings/
firewall/policer/then/discard?(0.399532922502):}</interface-specific-
settings>
          <rule>
            <name>{/p2p_source/connectivity-settings/firewall/family/ccc/
filter/term/rule-name(0.528725054466/ 0.518807453251):p2p_source/
connectivity-settings/firewall/policer/policer-name(0.464326959228):
p2p_source/endpoint/firewall/family/ccc/filter/filter-name
(0.42415667887)}</name>
          </rule>
        </acl>
      </if-firewall-config>
      <non-existent-parent>
        <general-config>
          <comment-str>{/p2p_source/basic-settings/comments?
(0.411403030303/ 0.518807453251):p2p_source/connectivity-settings/
firewall/policer/if-exceeding/bandwidth/bandwidth-limit?
(0.337521428571):p2p_source/connectivity-settings/firewall/policer/
if-exceeding/burst-size-limit?(0.331834920635)}</comment-str>
        </general-config>
      </non-existent-parent>
      <device-a>
        <filter>
          <rule>
            <policer>{/p2p_source/connectivity-settings/firewall/family/
ccc/filter/term/rule-name(0.529252589763/ 0.518807453251):p2p_source/
endpoint/firewall/family/ccc/filter/filter-name(0.503845079365):
p2p_source/endpoint/firewall/policer/policer-name(0.466005079365) <!--
this is a wrong mapping after this step -->:}</policer>
          </rule>
          <name>{/p2p_source/endpoint/firewall/family/ccc/filter/filter-
name(0.599292063492/ 0.518807453251):p2p_source/connectivity-
settings/firewall/family/ccc/filter/term/rule-name(0.501987165775):
p2p_source/endpoint/firewall/policer/policer-name(0.451049206349)}
</name>
        </filter>
      </device-a>
      <pseudowire-cfg>
        <pseudowire>
          <neighbor>
            <if>
              <VC-id>{/p2p_source/connectivity-settings/protocols/
l2circuit/neighbor/interface/virtual-circuit-id(0.540979075036/
0.518807453251):p2p_source/connectivity-settings/protocols/l2circuit/
neighbor/interface/mtu(0.49536302389):p2p_source/connectivity-
settings/protocols/l2circuit/neighbor/interface/ignore-encapsulation-
mismatch(0.462094064454)}</VC-id>
              <name>{/p2p_source/endpoint/l2circuit/neighbor/interface/
name?(0.496218835979/ 0.518807453251):p2p_source/connectivity-
settings/protocols/l2circuit/neighbor/interface/ignore-encapsulation-
mismatch?(0.481612582973):p2p_source/connectivity-settings/protocols/
l2circuit/neighbor/interface/mtu?(0.481612582973)}</name>
              <mtu>{/p2p_source/connectivity-settings/protocols/l2circuit/
neighbor/interface/mtu(0.597771313131/ 0.518807453251):p2p_source/
connectivity-settings/protocols/l2circuit/neighbor/interface/virtual-circuit-
id(0.515398297258):p2p_source/connectivity-settings/protocols/l2circuit/
neighbor/interface/ignore-encapsulation-mismatch(0.467131101491)}
</mtu>
            </if>
            <neighbor_identifier>{/p2p_source/connectivity-settings/
protocols/l2circuit/neighbor/interface/ignore-encapsulation-mismatch?
(0.463339544012/ 0.518807453251):p2p_source/connectivity-settings/
protocols/l2circuit/neighbor/interface/mtu?(0.463339544012):p2p_source/
connectivity-settings/protocols/l2circuit/neighbor/interface/virtual-circuit-
id?(0.463339544012) <!-- this is a wrong mapping after this step -->}
            </neighbor_identifier>
          </neighbor>
        </pseudowire >
      </pseudowire-cfg>
      <if-cfgs>
        <if-settings>
          <encapsulation>{/p2p_source/connectivity-settings/interfaces/
interface/unit/encapsulation?(0.478305264409/ 0.518807453251) <!-- this
is a wrong mapping after this step -->:p2p_source/connectivity-settings/
interfaces/interface/encapsulation?(0.454102388592):p2p_source/
connectivity-settings/firewall/policer/if-exceeding/bandwidth/bandwidth-
limit?(0.404166739927)}</encapsulation>
          <mtu>{/p2p_source/connectivity-settings/protocols/l2circuit/
neighbor/interface/mtu?(0.462599550123/ 0.518807453251):p2p_source/
connectivity-settings/interfaces/interface/mtu?(0.454102388592):
p2p_source/connectivity-settings/firewall/policer/if-exceeding/bandwidth/
bandwidth-limit?(0.402229417989)}</mtu>
          <acl-bw-limit>{/p2p_source/connectivity-settings/firewall/policer/
if-exceeding/burst-size-limit?(0.458214603175/ 0.518807453251):
p2p_source/connectivity-settings/firewall/policer/if-exceeding/bandwidth/
bandwidth-limit?(0.451904550265):p2p_source/connectivity-settings/
firewall/family/ccc/filter/term/rule-name?(0.329866904762)}</acl-bw-
limit>
        </if-settings>
      </if-cfgs>
    </p2p_destination>
```

After determining the name similarity score, translation template module 28 may determine a second intermediate score (212). The second intermediate value may be determined as follow: si_value=(0.6*fi_value)+(0.4*name similarity score). In some examples, translation template module 28 may compare the second intermediate value to a second threshold (e.g., 0.7) (214) and if the second intermediate value satisfies the second threshold ("YES" branch of 214), translation template module 28 may refrain from performing any additional similarity value calculations for this particular target and source node pair and, instead, use the second intermediate value as the overall similarity score for this particular target and source node pair (218).

If the second intermediate value does not satisfy the second threshold ("NO" branch of 214), translation template module 28 may determine the linguistic similarity between the attribute descriptions that are being compared (216). That is, translation template module 28 compares the descriptions of the target and source nodes to determine how linguistically similar the descriptions are to each other. In general, the descriptions are considered more similar if the target and source descriptions talk about the same subject. In some examples, translation template module 28 may determine the number of words that are in common between the two descriptions (excluding articles such as "a" and "the" and prepositions). Translation template module 28 may also determine the linguistic similarity between each word in one description (e.g., source description) and the words in the other description (e.g., target description), again excluding articles and prepositions. The more words that the descriptions contain that are linguistically similar to each other, the more linguistically similar the descriptions as a whole are to each other. Similar to determining the linguistic similarity between the attribute names, translation template module 28 may use any number of different natural language processing libraries and may use a different natural language processing library than used to determine the linguistic similarity between the attribute names. Also, as with many of the other similarity scores discussed above, translation template module 28 may normalize the linguistic similarity score to the inclusive range of 0 to 1.

Continuing the example using the example source and target YANG files provided above, the result following the determination of the attribute description linguistic similarity is as follows:

```
<p2p_destination>
  <if-firewall-config>
    <acl>
      <policer>
        <exceeds>
          <burst-size>{/p2p_source/connectivity-settings/firewall/
policer/if-exceeding/burst-size-limit?(0.517115075356/ 0.556484985937):
p2p_source/connectivity-settings/firewall/policer/then/discard?
(0.472588265766):p2p_source/connectivity-settings/firewall/policer/if-
exceeding/bandwidth/bandwidth-limit?(0.465434577526)}</burst-size>
        </exceeds>
        <then-drop>{/p2p_source/connectivity-settings/firewall/policer/
then/discard?(0.521385198812/ 0.556484985937):p2p_source/
connectivity-settings/firewall/policer/family/ccc/filter/interface-specific?
(0.464019331881):p2p_source/connectivity-settings/firewall/family/ccc/
filter/term/rule-name?(0.438495691865)}</then-drop>
        <name>{/p2p_source/connectivity-settings/firewall/policer/
policer-name(0.519016962589/ 0.556484985937):p2p_source/
connectivity-settings/firewall/family/ccc/filter/term/rule-name?
(0.510225821473):p2p_source/endpoint/firewall/family/ccc/filter/filter-
name?(0.48679790984)}</name>
      </policer>
    <acl>
      <interface-specific-settings>{/p2p_source/connectivity-settings/
firewall/family/ccc/filter/interface-specific?(0.545083110394/
0.556484985937):p2p_source/connectivity-settings/firewall/family/ccc/
filter/term/rule-name?(0.488457483183):p2p_source/endpoint/firewall/
family/ccc/filter/filter-name?(0.442404316381)</interface-specific-
settings>
      <rule>
        <name>{/p2p_source/connectivity-settings/firewall/family/ccc/
filter/term/rule-name?(0.618215599992/ 0.556484985937):p2p_source/
endpoint/firewall/family/ccc/filter/filter-name(0.522288108576):
p2p_source/connectivity-settings/firewall/family/ccc/filter/interface-
specific(0.484188546692)}</name>
      </rule>
    </acl>
  </acl>
  </if-firewall-config>
  <non-existent-parent>
    <general-config>
      <comment-str>{/p2p_source/basic-settings/comments?
(0.411403030303/ 0.556484985937):p2p_source/endpoint/firewall/
family/ccc/filter/filter-name?(0.310771428571)p2p_source/connectivity-
settings/firewall/policer/if-exceeding/bandwidth-limit?(0.310239153722)}
</comment-str>
    </general-config>
  </non-existent-parent>
  <device-a>
    <filter>
      <rule>
        <policer>{/p2p_source/connectivity-settings/firewall/family/
ccc/filter/term/rule-name(0.538106473535/ 0.556484985937):
p2p_source/endpoint/firewall/family/ccc/filter/filter-name?
(0.518486009757):p2p_source/connectivity-settings/firewall/family/ccc/
filter/interface-specific?(0.465904078743)} <!--this is a wrong mapping
after this step -->:}</policer>
      </rule>
      <name>{/p2p_source/endpoint/firewall/family/ccc/filter/filter-
name(0.656796571429/ 0.556484985937):p2p_source/connectivity-
settings/firewall/family/ccc/filter/term/rule-name(0.562783476936):
p2p_source/connectivity-settings/firewall/family/ccc/filter/interface-
specific(0.466722756975)}</name>
    </filter>
  </device-a>
  <pseudowire-cfg>
    <pseudowire>
      <neighbor>
        <if>
          <VC-id>{/p2p_source/connectivity-settings/protocols/
l2circuit/neighbor/interface/virtual-circuit-id(0.657738978355/
0.556484985937):p2p_source/connectivity-settings/protocols/l2circuit/
neighbor/interface/mtu(0.605758120356):p2p_source/connectivity-
settings/protocols/l2circuit/neighbor/interface/ignore-encapsulation-
mismatch(0.586269936615)}</VC-id>
          <name>{/p2p_source/endpoint/protocols/l2circuit/neighbor/
interface/name(0.623578285714/ 0.556484985937):p2p_source/
connectivity-settings/protocols/l2circuit/neighbor/interface/ignore-
encapsulation-mismatch(0.571999522675):p2p_source/connectivity-
settings/protocols/l2circuit/neighbor/interface/mtu(0.571999522675)}
</name>
          <mtu>{/p2p_source/connectivity-settings/protocols/l2circuit/
neighbor/interface/mtu(0.691996121212/ 0.556484985937):p2p_source/
connectivity-settings/protocols/l2circuit/neighbor/interface/virtual-circuit-
id(0.617779284378):p2p_source/connectivity-settings/protocols/l2circuit/
neighbor/interface/ignore-encapsulation-mismatch(0.589940272977)}
</mtu>
        </if>
        <neighbor_identifier>{/p2p_source/endpoint/protocols/l2circuit/
neighbor/neighbor-id(0.56188632381/ 0.556484985937):p2p_source/
connectivity-settings/protocols/l2circuit/neighbor/interface/ignore-
encapsulation-mismatch(0.533967944851):p2p_source/connectivity-
settings/protocols/l2circuit/neighbor/interface/mtu(0.533967944851)}
</neighbor_identifier>
      </neighbor>
    </pseudowire >
  </pseudowire-cfg>
  <if-cfgs>
    <if-settings>
      <encapsulation>{/p2p_source/connectivity-settings/interfaces/
interface/encapsulation?(0.533771515152/ 0.556484985937)p2p_source/
connectivity-settings/interfaces/interface/unit/encapsulation?
(0.523128589779):p2p_source/connectivity-settings/interfaces/interface/
unit/interface_unit_number?(0.36338601343)}</encapsulation>
      <mtu>{/p2p_source/connectivity-settings/interfaces/interface/mtu?
(0.533771515152/ 0.556484985937):p2p_source/connectivity-settings/
protocols/l2circuit/neighbor/interface/mtu?(0.374805808771):p2p_source/
connectivity-settings/interfaces/interface/unit/encapsulation?
(0.356242887701)}</mtu>
      <acl-bw-limit>{/p2p_source/connectivity-settings/firewall/policer/
if-exceeding/bandwidth/bandwidth-limit?(0.417410027251/
0.556484985937):p2p_source/connectivity-settings/firewall/policer/if-
exceeding/burst-size-limit?(0.383170083516):p2p_source/connectivity-
settings/interfaces/interface/mtu?(0.34887691035)}</acl-bw-limit>
    </if-settings>
  </if-cfgs>
</p2p_destination>
```

In instances where the first and second intermediate scores did not satisfy the first and second thresholds, respectively, template translation module determining the overall similarity score using the second intermediate value and the description similarity score (218). As one example, the third intermediate value is determined as follows: ti_value= (0.7*si_value)+(0.3*description similarity score). In general, translation template module 28 determines the total similarity score for the particular target and source node pair based on a combination of all or a subset of the above determined similarity scores.

In some examples, translation template module 28 may compute the overall similarity score for the target and source node pair based on a combination of the similarity scores of all of the ancestors. In some examples, translation template module 28 only determines this overall similarity score for nodes that are leaves or YANG containers with "presence." Translation template module may apply different weights to each of the different similarity scores of the ancestor nodes and, as with the other weights described above, may adjust the weights to tweak the results and improve the accuracy of the process. As one example, translation template module 28 may determine the overall similarity score by averaging the similarity score of the current node with the similarity scores of each of its ancestor nodes.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a network management device, service configuration information for a particular network service, the service configuration information including a mapping from a service model for the particular network service to a vendor neutral model;
determining, by the network management device and based on the mapping from the service model to the vendor neutral model, a subset of the plurality of nodes included in the vendor neutral model as a set of source nodes;
for each node in the set of source nodes, generating, by the network management device and based on a target device specific model for a target network device, a mapping of nodes of the vendor neutral model to nodes of the target device specific model, the mapping to include at least one source node and an associated target node, wherein the target device does not currently support the particular network service; and
configuring, by the network management device and using the mapping, the target network device to support the particular network service.

2. The method of claim 1, wherein configuring the target network device to support the particular network service comprises:
generating, by the network management device and based on the mapping, an updated device specific configuration file; and
configuring, by the network management device and using the updated device specific configuration file, the target network device such that the configured target network device supports the particular network service.

3. The method of claim 1, further comprising:
modifying, by the network management device, the vendor neutral model to include one or more nodes required to support the particular network service.

4. The method of claim 1, further comprising:
prior to generating the mapping, determining, by the network management device, a respective similarity score for each unique source node and target node pair, the respective similarity score indicating an amount of similarity between the source node and the target node of the corresponding source node and target node pair, wherein generating the mapping is further based on the respective similarity scores for the source node and target node pairs.

5. The method of claim 4, wherein determining the respective similarity score for each unique source node and target node pair comprises:
determining, by the network management device, a respective similarity score for each ancestor of the target node; and
determining, by the network management device and based on a combination of the respective similarity scores for the one or more ancestors of the target node and the respective similarity score for the target node, the respective similarity score for the source node and target node pair.

6. The method of claim 4, wherein generating the mapping comprises:
generating a similarity matrix including the respective similarity scores for the source node and target node pairs;
for each source node, determining, based on the similarity matrix, a respective source node and target node pair having a maximum similarity score; and
generating, by the management device, the mapping to include, for each source node, the source node and target node pairs having the maximum similarity scores.

7. The method of claim 6, further comprising:
determining whether the maximum similarity score for each source node from the set of source nodes satisfies a threshold similarity score; and
if the maximum similarity score for a particular source node does not satisfy the threshold similarity score, marking the mapping from the particular source node to the target node as being error prone.

8. The method of claim 6, further comprising:
outputting, by the network management device, a graphical indication of the mapping of the one or more nodes of the vendor neutral model to the one or more nodes of the target device specific model;

receiving, by the network management device, an indication of a user input to modify at least one source node and associated target node mapping; and updating, by the network device and based on the indication of the user input, the mapping.

9. The method of claim 1, further comprising:

determining, by the management device, a respective module similarity score for each module of a plurality of modules of the target device specific model for the target network device, wherein each module from the plurality of modules includes a respective set of nodes from the plurality of nodes included in the target device specific model;

selecting, by the management device, a particular module from the plurality of modules having a highest value of the respective module similarity scores; and for each unique source node and target node pair for the respective set of nodes included in the particular module:

determining, by the network management device, a type similarity score for a data type of the source node and a data type of the target node;

determining, by the network management device, a name distance similarity score of a name of the source node and a name of the target node;

determining, by the network management device, a structural similarity score; and determining, by the network management device and based on a combination of the type similarity score, the name distance similarity score, and the structural similarity score, a respective similarity score for the corresponding unique source node and target node pair, wherein generating the mapping is further based on the respective similar scores for the source node and target node pairs.

10. The method of claim 9, wherein determining the type similarity score comprises:

determining, by the network management device, a metadata type similarity score for metadata associated with the source node and metadata associated with the target node;

determining, by the network management device, a data type similarity score for an expressed type of the source node and an expressed type of the target node; and determining, by the management device and based on a combination of the metadata type similarity score and the data type similarity score, the type similarity score.

11. The method of claim 9, wherein the respective similarity score for the corresponding unique source node and target node pair is a first respective similarity score for the corresponding unique source node and target node pair, and wherein determining the respective similarity score for each unique source node and target node pair further comprises, responsive to determining that the first respective similarity score for the corresponding unique source node and target node pair does not satisfy a first threshold similarity score:

determining, by the network management device, a name similarity score for a name of the source node and a name of the target node; and determining, by the network management device and based on a combination of the first respective similarity score for the corresponding unique source node and target node pair and the name similarity score, a second respective similarity score.

12. The method of claim 11, wherein determining the respective similarity score for each unique source node and target node pair further comprises, in response to determining that the second respective similarity score for the corresponding unique source node and target node pair does not satisfy a threshold second similarity score:

determining, by the network management device, a description similarity score for a description of the source node and a description of the target node; and determining, by the network management device and based on a combination of the second respective similarity score for the corresponding unique source node and target node pair and the description similarity score, a third respective similarity score for the source node and target node pair.

13. A network management system comprising:

an interface configured to receive service configuration information for a particular network service and a target device specific configuration file, the service configuration information including a mapping from a service model for the particular network service to a vendor neutral model;

one or more network interfaces communicatively coupled to a plurality of network devices, wherein the target network device is one of the plurality of network devices; and one or more hardware-based processors, implemented using discrete logic circuitry, configured to:

determine, based on the mapping from the service model to the vendor neutral model, a subset of the plurality of nodes included in the vendor neutral model as a set of source nodes;

for each node in the set of source nodes, generate, based on a target device specific model for a target network device, a mapping of nodes of the vendor neutral model to nodes of the target device specific model, the mapping to include at least one source node and an associated target node, wherein the target device does not currently support the particular network service;

configure, using the mapping, the target network device to support the particular network service.

14. The network management system of claim 13, wherein, to configure the target network device to support the particular network service, the one or more processors are configured to:

generate, based on the mapping, an updated device specific configuration file; and configure, using the updated device specific configuration file, the target network device such that the configured target network device supports the particular network service.

15. The network management system of claim 13, wherein the one or more processors are further configured to:

modify the vendor neutral model to include one or more nodes required to support the particular network service.

16. The network management system of claim 13, wherein the one or more processors are further configured to:

determine a respective module similarity score for each module of a plurality of modules of the target device specific model for the target network device, wherein each module from the plurality of modules includes a respective set of nodes from the plurality of nodes included in the target device specific model;

select a particular module from the plurality of modules having a highest value of the respective module similarity scores;

for each unique source node and target node pair for the respective set of nodes included in the particular module:

determine a type similarity score for a data type of the source node and a data type of the target node;

determine a name distance similarity score of a name of the source node and a name of the target node;

determine a structural similarity score; and determine, based on a combination of the type similarity score, the name distance similarity score, and the structural similarity score, a respective similarity score for the corresponding unique source node and target node pair; and generate the mapping further based on the respective similar scores for the source node and target node pairs.

17. The network management system of claim 13, wherein the one or more processors are further configured to:

prior to generating the mapping, determine a respective similarity score for each unique source node and target node pair, the respective similarity score indicating an amount of similarity between the source node and the target node of the corresponding source node and target node pair; and generate the mapping further based on the respective similarity scores for the source node and target node pairs.

18. The network management system of claim 17, wherein the one or more processors are further configured to:

determine the respective similarity score for each unique source node and target node pair by at least being configured to:

determine a respective similarity score for each ancestor of the target node; and determine, based on a combination of the respective similarity scores for the one or more ancestors of the target node and the respective similarity score for the target node, the respective similarity score for the source node and target node pair; and generate the mapping by at least being configured to:

generate a similarity matrix including the respective similarity scores for the source node and target node pairs;

for each source node, determine, based on the similarity matrix, a respective source node and target node pair having a maximum similarity score;

generate the mapping to include, for each source node, the source node and target node pairs having the maximum similarity scores.

19. A computer-readable storage medium comprising instructions that, when executed, cause a processor of a network management system to:

receive service configuration information for a particular network service, the service configuration information including a mapping from a service model for the particular network service to a vendor neutral model;

determine, based on the mapping from the service model to the vendor neutral model, a subset of the plurality of nodes included in the vendor neutral model as a set of source nodes;

for each node in the set of source nodes, generate, based on a target device specific model for a target network device, a mapping of nodes of the vendor neutral model to nodes of the target device specific model, the mapping to include at least one source node and an associated target node, wherein the target device does not currently support the particular network service; and configure, using the mapping, the target network device to support the particular network service.

* * * * *